(12) United States Patent
Barnes et al.

(10) Patent No.: US 8,678,260 B2
(45) Date of Patent: Mar. 25, 2014

(54) BLADELESS CLEAVERS HAVING AN ARCUATE EXTERIOR SURFACE AND RELATED METHODS FOR CLEAVING AN OPTICAL FIBER USING AN ABRASIVE MEDIUM

(75) Inventors: Brandon A. Barnes, Fr. Worth, TX (US); Joshua D. Raker, Lewisville, TX (US); Greg J. Scherer, Keller, TX (US); Scott E. Semmler, Roanoke, TX (US)

(73) Assignee: Corning Cable Systems LLC, Hickory, NC (US)

( * ) Notice: Subject to any disclaimer, the term of this patent is extended or adjusted under 35 U.S.C. 154(b) by 501 days.

(21) Appl. No.: 12/710,746

(22) Filed: Feb. 23, 2010

(65) Prior Publication Data

US 2011/0204116 A1 Aug. 25, 2011

(51) Int. Cl.
*B26F 3/00* (2006.01)
(52) U.S. Cl.
USPC ................................................ 225/2; 225/96
(58) Field of Classification Search
USPC .................. 225/2, 96, 105, 96.5, 101, DIG. 7; 83/105, 102, 407, 401, 425, 856, 922, 83/13, 651, 6; 76/104.1; 69/2; 385/135, 385/173, 137, 136, 134
See application file for complete search history.

(56) References Cited

U.S. PATENT DOCUMENTS

| | | | | |
|---|---|---|---|---|
| 2,749,675 A | * | 6/1956 | Frank et al. | 451/305 |
| 4,017,013 A | * | 4/1977 | Hawk et al. | 225/96.5 |
| 4,036,419 A | * | 7/1977 | Hensel et al. | 225/96.5 |
| 4,039,309 A | | 8/1977 | Albanese et al. | |
| 4,046,298 A | * | 9/1977 | Schroeder, Jr. | 225/2 |
| 4,154,385 A | * | 5/1979 | Lewis | 225/96.5 |
| 4,176,909 A | * | 12/1979 | Prunier | 385/85 |
| 4,456,159 A | * | 6/1984 | Roberts et al. | 225/96.5 |
| 4,463,886 A | * | 8/1984 | Thornton | 225/96.5 |
| 4,643,520 A | | 2/1987 | Margolin | 350/96.2 |
| 4,674,833 A | | 6/1987 | Des Forges et al. | 350/96.21 |
| 4,730,763 A | * | 3/1988 | Smith | 225/96 |
| 5,125,549 A | * | 6/1992 | Blackman et al. | 225/96.5 |
| 5,351,333 A | | 9/1994 | Chambers | 385/134 |

(Continued)

FOREIGN PATENT DOCUMENTS

| | | | | |
|---|---|---|---|---|
| SU | | 920012 A1 | 4/1982 | |
| WO | WO 2009/051918 AI | | 4/2009 | ............... G02B 6/25 |
| WO | WO2009051918 A1 | | 4/2009 | |

OTHER PUBLICATIONS

International Search Report on Patentability dated Aug. 28, 2012 pertaining to International Appin. No. PCT/US2011/024152.

*Primary Examiner* — Ghassem Alie

(57) ABSTRACT

Methods, cleavers, and packagings for cleaving an optical fiber using an abrasive medium are disclosed. In one embodiment, a bladeless cleaver includes a body having an arcuate exterior surface, which may be provided in one embodiment by an exterior surface of a tool or toolkit, such as, but not limited to, a consumables kit or other packaging. A cleaver structure is disposed on the body such that a space between the arcuate exterior surface of the body and the cleaver structure is configured to receive a portion of the optical fiber to be cleaved. The cleaver structure comprises an abrasive medium carrier that is configured to be actuated to place the abrasive medium in contact with the portion of the optical fiber to create a flaw in the portion of the optical fiber. In another embodiment, the portion of the optical fiber may be positioned directly along the arcuate exterior surface of the body.

9 Claims, 26 Drawing Sheets

(56) References Cited

U.S. PATENT DOCUMENTS

| | | | |
|---|---|---|---|
| 5,408,558 A | 4/1995 | Fan | 385/80 |
| 5,563,974 A | 10/1996 | Carpenter et al. | 385/85 |
| 2009/0060428 A1* | 3/2009 | Mullaney et al. | 385/95 |
| 2010/0270350 A1* | 10/2010 | Bylander et al. | 225/2 |

* cited by examiner

BLADELESS CLEAVERS HAVING AN ARCUATE EXTERIOR SURFACE AND RELATED METHODS FOR CLEAVING AN OPTICAL FIBER USING AN ABRASIVE MEDIUM

RELATED APPLICATIONS

This application is related to U.S. patent application Ser. No. 12/697,604, filed on Feb. 1, 2010, entitled "METHODS, CLEAVERS, AND PACKAGINGS FOR CLEAVING AN OPTICAL FIBER USING AN ABRASIVE MEDIUM," and U.S. patent application Ser. No. 12/710,920, filed on even date herewith, entitled "BLADELESS CLEAVERS HAVING A FLEXIBLE TONGUE AND RELATED METHODS FOR CLEAVING AN OPTICAL FIBER USING AN ABRASIVE MEDIUM," both of which are incorporated herein by reference in their entireties.

BACKGROUND

1. Field of the Disclosure

The technology of the disclosure relates to cleaving optical fibers to provide an end face on the optical fibers for fiber optic termination preparations.

2. Technical Background

Optical fibers can be used to transmit or process light in a variety of applications. Benefits of optical fiber include extremely wide bandwidth and low noise operation. Because of the advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

Optical communication networks involve termination preparations to establish connections between disparate optical fibers. For example, optical fibers can be spliced together to establish an optical connection. Optical fibers can also be connectorized with fiber optic connectors that can be plugged together to establish an optical connection. In either case, it may be necessary for a technician to establish the optical connection in the field. The technician cleaves the optical fiber to prepare an end face on the optical fiber. The technician may employ a cleaver that includes a blade to score, scribe, or otherwise induce a flaw in the glass of the optical fiber. Inducing a flaw in the glass of an optical fiber precedes breaking the glass at the flaw to produce an end face. The blade may either by pressed into the glass or swiped across the glass to induce the flaw. The end face can then either be spliced to another optical fiber or connectorized with a fiber optic connector to establish an optical connection.

Conventional cleaver blades are expensive. Conventional cleaver blades may employ an expensive hardened material(s), including diamond, sapphire, ruby, ceramics, steel, and carbide, as examples. Further, the conventional cleaver blade needs to include an extremely sharp edge to minimize the size of the flaw induced in the glass to reduce risk of damaging the core of the optical fiber to provide efficient light transfer. Providing a sharp edge on the conventional cleaver blade adds cost. Inducing a large flaw in the glass may create a poor end face. Maintenance must be provided to keep the conventional cleaver blade sharp.

SUMMARY OF THE DETAILED DESCRIPTION

Embodiments disclosed in the detailed description include methods, cleavers, and packagings for cleaving an optical fiber using an abrasive medium. The abrasive medium may be placed into contact with a portion of an optical fiber to induce a flaw in the portion of the optical fiber. The optical fiber is broken about the induced flaw to create an end face for fiber optic termination preparations. Cleaving the optical fiber prepares an end face on the optical fiber to prepare fiber optic terminations, including in the field. In this manner, the cost of the cleaver may be reduced by employing the abrasive medium. The abrasive medium may be sufficiently inexpensive to be disposable as opposed to maintaining a conventional cleaver blade. The abrasive medium may also be disposed on a flexible carrier that allows the abrasive medium to be employed in flexible manners and cleaver form factors and/or packagings.

In this regard, in one embodiment, a bladeless cleaver for cleaving an optical fiber is disclosed. The bladeless cleaver for cleaving an optical fiber comprises a body having an arcuate exterior surface. A cleaver structure is disposed on the body and comprises an abrasive medium carrier configured to support an abrasive medium. The cleaver structure is disposed on the body such that a space between the arcuate exterior surface of the body and the cleaver structure configured to receive a portion of an optical fiber to be cleaved is provided. The arcuate exterior surface in one embodiment may be provided by an exterior surface of a toolkit, such as, but not limited to, a consumables kit or other packaging. The abrasive medium carrier is configured to be actuated to place the abrasive medium in contact with the portion of the optical fiber to create a flaw in the portion of the optical fiber.

In another embodiment, another bladeless cleaver for cleaving an optical fiber is provided. The bladeless cleaver comprises a body having an arcuate exterior surface configured to allow a portion of an optical fiber to be positioned along the arcuate exterior surface. As one non-limiting example, the arcuate exterior surface is provided as the exterior surface of a tool, and the arcuate exterior surface is configured such that a bend in the portion of the optical fiber occurs when placed along the arcuate exterior surface. A cleaver structure is disposed on the body and comprises an abrasive medium carrier configured to support an abrasive medium. The abrasive medium carrier is configured to be actuated to place the abrasive medium in contact with the portion of the optical fiber to create a flaw in the portion of the optical fiber. In one embodiment, the body having the arcuate exterior surface may be part of a tool, such as a pair of scissors, for example.

In another embodiment, a method for cleaving an optical fiber without employing a conventional blade is provided. In one embodiment, the method includes positioning a portion of an optical fiber in a space provided between an arcuate exterior surface of a body of a bladeless cleaver and a cleaver structure disposed on the body such that the portion of the optical fiber bends around the arcuate exterior surface of the body. The arcuate exterior surface in one embodiment may be provided by an exterior surface of a toolkit, such as, but not limited to, a consumables kit or other packaging. In another embodiment, a portion of an optical fiber is positioned around an arcuate exterior surface of a body of a tool such that the portion of the optical fiber bends around the arcuate exterior surface of the body. In these embodiments, a tension is applied to the portion of the optical fiber. A flaw is then created in the portion of the optical fiber by actuating an abrasive medium carrier attached to the body to place an abrasive medium disposed in the abrasive medium carrier in contact with the portion of the optical fiber to create the flaw in the portion of the optical fiber. After the flaw is created, the optical fiber is broken at the flaw to create a cleaved end face on the optical fiber.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Figure 1:
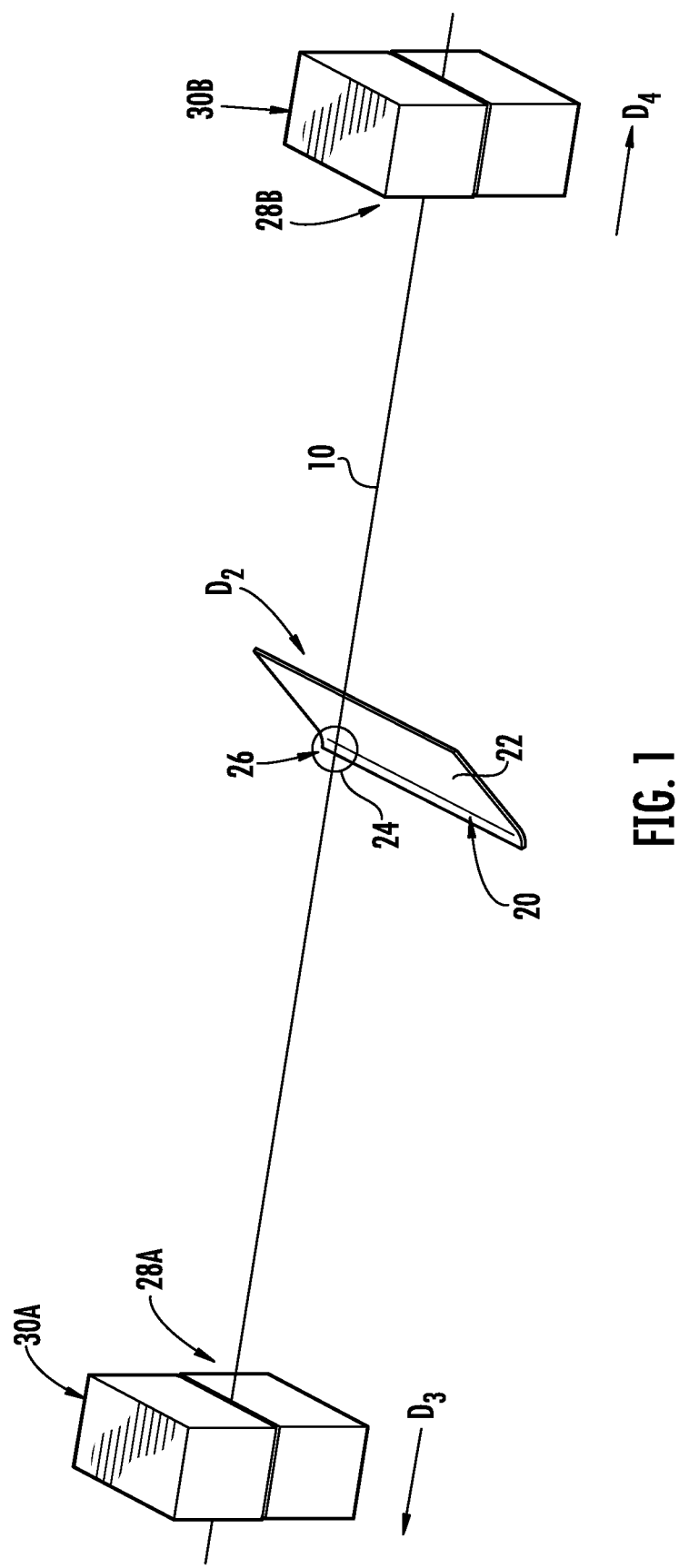
FIG. 1 is an exemplary method for cleaving an optical fiber by creating a flaw in a portion of the optical fiber using an abrasive medium.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include methods, cleavers, and packagings for cleaving an optical fiber using an abrasive medium. The abrasive medium may be placed into contact with a portion of an optical fiber to induce a flaw in the portion of the optical fiber. The optical fiber is broken about the induced flaw to create an end face for fiber optic termination preparations. Cleaving the optical fiber prepares an end face on the optical fiber to prepare fiber optic terminations, including in the field. In this manner, the cost of the cleaver may be reduced by employing the abrasive medium. The abrasive medium may be sufficiently inexpensive to be disposable as opposed to maintaining a conventional cleaver blade. The abrasive medium may also be disposed on a flexible carrier that allows the abrasive medium to be employed in flexible manners and cleaver form factors and/or packagings.

In this regard, in one embodiment, a bladeless cleaver for cleaving an optical fiber is disclosed. The bladeless cleaver for cleaving an optical fiber comprises a body having an arcuate exterior surface. A cleaver structure is disposed on the body and comprises an abrasive medium carrier configured to support an abrasive medium. The cleaver structure is disposed on the body such that a space between the arcuate exterior surface of the body and the cleaver structure configured to receive a portion of an optical fiber to be cleaved is provided. The arcuate exterior surface in one embodiment may be provided by an exterior surface of a toolkit, such as, but not limited to, a consumables kit or other packaging. The abrasive medium carrier is configured to be actuated to place the abrasive medium in contact with the portion of the optical fiber to create a flaw in the portion of the optical fiber.

In another embodiment, another bladeless cleaver for cleaving an optical fiber is provided. The bladeless cleaver comprises a body having an arcuate exterior surface configured to allow a portion of an optical fiber to be positioned along the arcuate exterior surface. As one non-limiting example, the arcuate exterior surface is provided as the exterior surface of a tool, and the arcuate exterior surface is configured such that a bend in the portion of the optical fiber occurs when placed along the arcuate exterior surface. A cleaver structure is disposed on the body and comprises an abrasive medium carrier configured to support an abrasive medium. The abrasive medium carrier is configured to be actuated to place the abrasive medium in contact with the portion of the optical fiber to create a flaw in the portion of the optical fiber. In one embodiment, the body having the arcuate exterior surface may be part of a tool, such as a pair of scissors, for example.

In another embodiment, a method for cleaving an optical fiber without employing a conventional blade is provided. In one embodiment, the method includes positioning a portion of an optical fiber in a space provided between an arcuate exterior surface of a body of a bladeless cleaver and a cleaver structure disposed on the body such that the portion of the optical fiber bends around the arcuate exterior surface of the body. The arcuate exterior surface in one embodiment may be provided by an exterior surface of a toolkit, such as, but not limited to, a consumables kit or other packaging. In another embodiment, a portion of an optical fiber is positioned around an arcuate exterior surface of a body of a tool such that the portion of the optical fiber bends around the arcuate exterior surface of the body. In these embodiments, a tension is applied to the portion of the optical fiber. A flaw is then created in the portion of the optical fiber by actuating an abrasive medium carrier attached to the body to place an abrasive medium disposed in the abrasive medium carrier in contact with the portion of the optical fiber to create the flaw in the portion of the optical fiber. After the flaw is created, the optical fiber is broken at the flaw to create a cleaved end face on the optical fiber.

An abrasive medium for cleaving an optical fiber is more economical than a conventional cleaver blade. An abrasive medium for cleaving an optical fiber may cost on the order of cents, whereas conventional cleaver blades can cost tens of dollars up to a hundred dollars as an example. By employing a less expensive abrasive medium, costs associated with maintaining a sharp edge on a conventional cleaver blade to avoid inducing a large flaw in an optical fiber are avoided. Consequently, with the cleavers and methods disclosed, it is financially feasible to dispose and replace a used abrasive medium in the cleaver with a new abrasive medium after a few uses. For example, the abrasive medium may be disposed and replaced after ten (10) to twenty (20) cleaves. Use of an abrasive medium to cleave an optical fiber may also allow smaller form factors of optical fiber cleavers over use of conventional cleaver blades. The abrasive medium may be disposed on a rigid or flexible member. If the abrasive medium is disposed on a flexible member, the abrasive medium may be easily disposed and replaceable in a variety of cleaver form factors, thus making these form factors feasible for use by technicians to cleave optical fibers.

Figure 2:
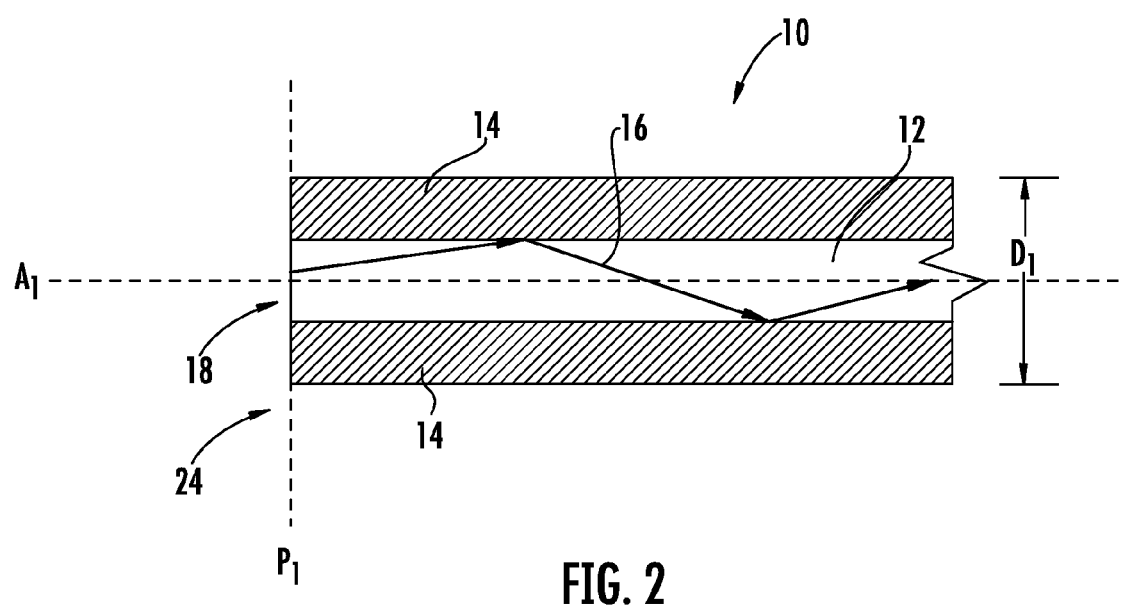
FIG. 2 schematically illustrates an exemplary end face of the optical fiber of FIG. 1 after being cleaved using the abrasive medium in FIG. 1.

In this regard, FIG. 1 is an exemplary method for cleaving an optical fiber by creating or inducing a flaw in a portion of the optical fiber using an abrasive medium. As illustrated therein, an optical fiber 10 is provided. The optical fiber 10 can be any type of optical fiber, including but not limited to a single-mode optical fiber and a multi-mode optical fiber. The optical fiber 10 may be of any size diameter $D_1$, as illustrated in FIG. 2. The optical fiber 10 may include a core 12 surrounded by cladding 14 to provide total internal reflection (TIR) of light 16 propagated down the core 12, as illustrated in FIG. 2. The cladding 14 may be provided as glass or other material, including but not limited to a polymer cladding such as a plastic clad silica as an example. An outer coating (not shown) may be disposed around the cladding 14. The optical fiber 10 may be provided as part of a single fiber or multi-fiber fiber optic cable.

When splicing or connectorizing the optical fiber 10, it is necessary to provide an end face 18 on the optical fiber 10, as schematically illustrated in FIG. 2. The end face 18 is aligned with an end face of another optical fiber to transfer the light 16 from the optical fiber 10 to the spliced or connected optical fiber. When splicing or connectorizing an optical fiber, it is important to provide an end face 18 that has a relatively smooth and mirror-like surface to achieve an efficient light transfer. It is also important to avoid damaging the core 12 and/or the cladding 14 of the optical fiber 10. In this regard, the optical fiber 10 is cleaved to prepare the end face 18. The end face 18 is prepared by introducing a flaw into a portion of the optical fiber 10. The end face 18 is formed when the optical fiber 10 is broken about the induced flaw.

In this regard, instead of employing a conventional blade to cleave the optical fiber, an abrasive medium 20 is employed, as illustrated in FIG. 1. The abrasive medium 20 is an abrasive material. The abrasive medium 20 is disposed on a carrier 22 in this embodiment. The carrier 22 is controlled to bring the abrasive medium 20 in contact with a portion 24 of the optical fiber 10, as illustrated in FIG. 1, to induce a flaw 26 in the portion 24 of the optical fiber 10. The flaw 26 cracks the portion 24 of the optical fiber 10. The end face 18 is created in the portion 24 of the optical fiber 10 by breaking the optical fiber 10 at the flaw 26. In this manner, the abrasive medium 20 cleaves the optical fiber 10.

The abrasive medium 20 is not a conventional blade in this embodiment. A conventional blade is typically a hardened material that has a sharp edge. The abrasive medium 20 does not have a sharp edge. A conventional blade has a smooth surface, wherein the abrasive medium 20 does not have a smooth surface. Simply stated, the abrasive medium 20 does not include a sharp blade that can easily be placed into precise contact with an optical fiber like the conventional blade. Thus, the cleaving of the optical fiber 10 in FIG. 1 using the abrasive medium 20 is a bladeless form and method of cleaving the optical fiber 10.

The carrier 22 may be controlled by human hand or a cleaving device, examples of which will be described below in this disclosure, to place the abrasive medium 20 in contact with the optical fiber 10 to induce the flaw 26 in the optical fiber 10. In the embodiment of FIG. 1, the optical fiber 10 is held in place while the carrier 22 is moved in a direction $D_2$ towards the portion 24 of the optical fiber 10 to bring the abrasive medium 20 in contact with the portion 24 of the optical fiber 10. The carrier 22 may be controlled in a swiping motion for example. Alternatively, the carrier 22 could be held in place and the portion 24 of the optical fiber 10 moved to be brought into contact with the abrasive medium 20. In either case, relative movement is created between the portion 24 of the optical fiber 10 and the abrasive medium 20 to create the flaw 26.

Any coating (not shown) disposed on the outside of the optical fiber 10 is removed prior to placing the abrasive medium 20 in contact with the optical fiber 10 so that the abrasive medium 20 directly contacts glass of the optical fiber 10. In this regard, any coating disposed around the core 12 and/or the cladding 14 may be removed prior to placing the abrasive medium 20 in contact with the optical fiber 10.

The abrasive medium 20 may be material provided in grit form on the carrier 22. The abrasive medium 20 may be provided by any type of material or combination or compound of elements or materials. Non-limiting examples of the abrasive medium 20 include, but are not limited to diamond, silicon carbide, aluminum oxide, silicon dioxide, cerium oxide, and ferrous oxide. The size of the abrasive medium 20 may be any suitable size. As an example only, the size of the abrasive medium 20 may be between five (5) and twenty (20) micrometers (μm) as a non-limiting example. For example, the abrasive medium 20 may be fifteen (15) μm diamond, or eight (8) μm carbide, as non-limiting examples.

The carrier 22 may be any material that is configured to support the abrasive medium 20 disposed or deposited thereon. For example, the carrier 22 may be a film, such as a polishing film. The abrasive medium 20 is disposed on a surface of the carrier 22. The abrasive medium 20 may be disposed or deposited on the entire surface area of the carrier 22 or only a portion of the surface area of the carrier 22. For example, the abrasive medium 20 may be disposed on an edge of the carrier 22. Other non-limiting examples of carriers, include, but are not limited to a wire, a string, a block, and a body. The carrier 22 may be of any size and made from any type of material desired, including but not limited to a polymer, plastic, and metal, as non-limiting examples. The quality and nature of the abrasive medium 20 and the carrier 22 determine the life or number of uses to cleave the optical fiber 10.

The carrier 22 may be rigid or flexible. In the embodiment illustrated in FIG. 1, the carrier 22 is flexible. Providing a flexible carrier 22 allows a precise portion of the abrasive medium 20 disposed or deposited thereon to be placed into contact with the optical fiber 10 to induce the flaw 26 in the portion 24 of the optical fiber 10 in FIG. 1 in this embodiment. Providing a flexible carrier 22 may also allow the deploying of the abrasive medium 20 in cleavers and other packagings that may not be possible or convenient if a conventional blade cleaver were employed. Examples of such cleavers and packagings are discussed in more detail below with regard to FIGS. 3-14.

The optical fiber 10 may be placed under stress prior to placing the abrasive medium 20 in contact with the optical fiber 10 to cleave the same. Placing the optical fiber 10 under stress prevents the portion 24 of the optical fiber 10 from moving when contacted by the abrasive medium 20. Placing the optical fiber 10 under stress prior to inducing the flaw 26 in the optical fiber 10 with the abrasive medium 20 also propagates the induced flaw 26 to cleave the optical fiber 10. Examples of placing the optical fiber 10 under stress includes but is not limited to placing a tension on the optical fiber 10, rotating or twisting the optical fiber 10, or bending the optical fiber 10.

For example, the optical fiber 10 in FIG. 1 is placed under tension prior to the abrasive medium 20 being placed into contact with the portion 24 of the optical fiber 10. As illustrated in FIG. 1, portions 28A, 28B of the optical fiber 10 disposed on each side of the portion 24 of the optical fiber 10 where the flaw 26 is desired to be induced are clamped by clamps 30A, 30B. The clamps 30A, 30B with the portions 28A, 28B of the optical fiber 10 secured therein may be pulled away from each other in directions $D_3$ and $D_4$ to place the portion 24 of the optical fiber 10 under tension. Thus, once the flaw 26 is introduced by the abrasive medium 20 in the portion 24 of the optical fiber 10, the tension will cause the portion 24 of the optical fiber 10 to break about the flaw 26 to create the end face 18. If the portion 24 of the optical fiber 10 is not placed under a stress when the flaw 26 is introduced by the abrasive medium 20, a stress could be subsequently placed on the portion 24 of the optical fiber 10 to create the break about the flaw 26 to create the end face 18.

It may also be desirable to bend the portion 24 of the optical fiber 10 in addition to placing the portion 24 of the optical fiber 10 under a tension or other stress prior to inducing the flaw 26 with the abrasive medium 20. Placing a bend in the portion 24 of the optical fiber 10 assists in propagating the flaw 26 into a break in the portion 24 of the optical fiber 10 to create the end face 18. Placing a bend in the portion 24 of the optical fiber 10 creates tension on the outside surface of a bent portion of the optical fiber 10, which assists in propagating the flaw 26 into a break in the portion 24 of the optical fiber 10.

After the portion 24 of the optical fiber 10 is broken at the flaw 26, the end face 18 is created, as illustrated by example in FIG. 2. The end face 18 illustrated in FIG. 2 is disposed in the portion 24 of the optical fiber 10 in a cross-sectional plane $P_1$ orthogonal or substantially orthogonal to a longitudinal axis $A_1$ of the optical fiber 10. However, the abrasive medium 20 could also be used to provide an angle-cleaved end face in the portion 24 of the optical fiber 10, if desired. For example, the portion 24 of the optical fiber 10 could be rotated during the introduction of the flaw 26 with the abrasive medium 20 to affect the angle of the end face created in the portion 24 of the optical fiber 10. The apex of the bend disposed in the portion 24 of the optical fiber 10 when the abrasive medium 20 is used to induce the flaw 26 can also affect the angle of the end face created in the portion 24 of the optical fiber 10. Methods of creating an angled-end face using a conventional cleaver blade can be used to create an angled end face using the abrasive medium 20.

Figure 3:
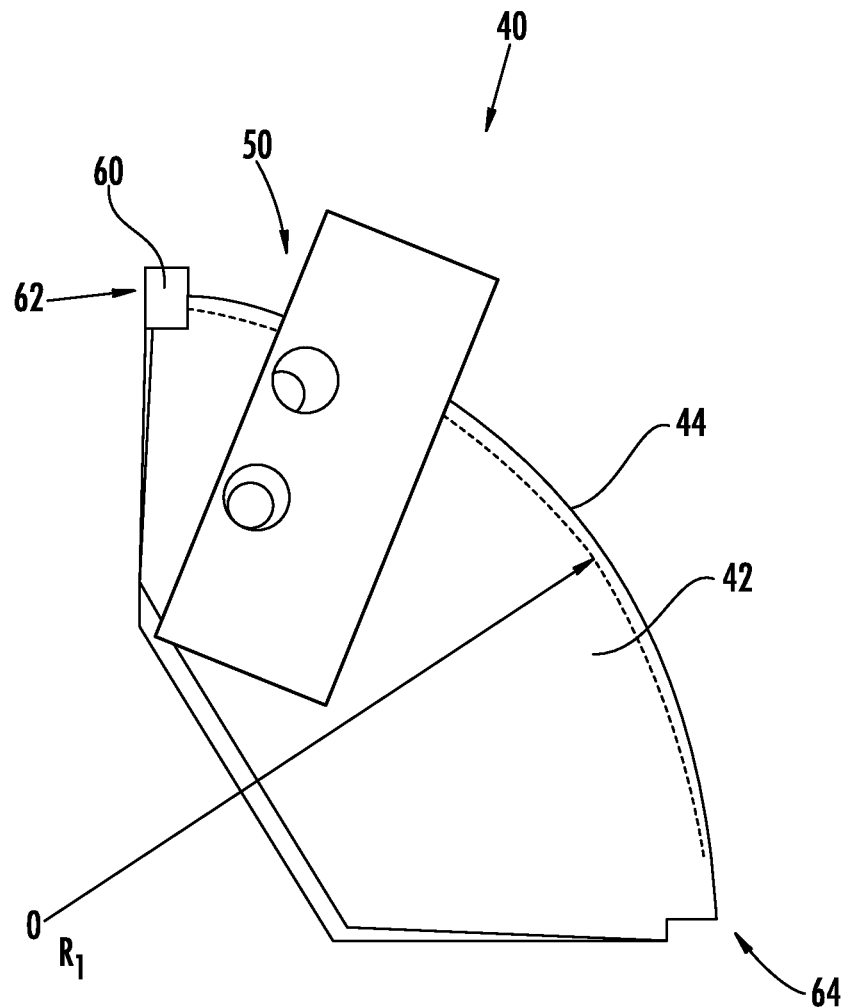
FIG. 3 is a side view of an exemplary bladeless cleaver configured to place an abrasive medium in contact with a portion of the optical fiber to create a flaw in the portion of the optical fiber.

The remainder of this disclosure includes exemplary methods, cleavers, and packagings that employ an abrasive medium to cleave an optical fiber. The methods and principles discussed above and with respect to FIGS. 1 and 2 may be employed in these methods, cleavers, and packagings. In this regard, FIG. 3 is a side view of an exemplary bladeless cleaver 40 that is configured to support an abrasive medium that is placed in contact with a portion of an optical fiber to cleave the optical fiber. As will be discussed in more detail below with regard to FIGS. 3-10, the bladeless cleaver 40 is designed to allow a technician to engage a portion of an optical fiber to be cleaved, to place a bend in the portion of the optical fiber, to clamp and strip the portion of the optical fiber, and place a supported abrasive material in contact with the portion of the optical fiber to create a flaw in the portion of the optical fiber.

In other embodiments, as will be discussed in more detail below with regard to FIGS. 15-27, bladeless cleavers may be incorporated into a tool, toolkit, a consumables kit, or other apparatuses or packagings used by a technician to establish an optical connection in the field. In this manner, a technician may be able to cleave an optical fiber easily and efficiently by using a bladeless cleaver that is incorporated into a tool, kit, or other apparatus or packagings that he already has with him, which reduces the number of tools needed to be carried by the technician. The bladeless cleavers of FIGS. 15-27 are designed to allow a technician to engage a portion of an optical fiber to be cleaved, to place a bend in the portion of the optical fiber, and place an abrasive material in contact with the portion of the optical fiber to create a flaw in the portion of the optical fiber are possible.

Figure 4:
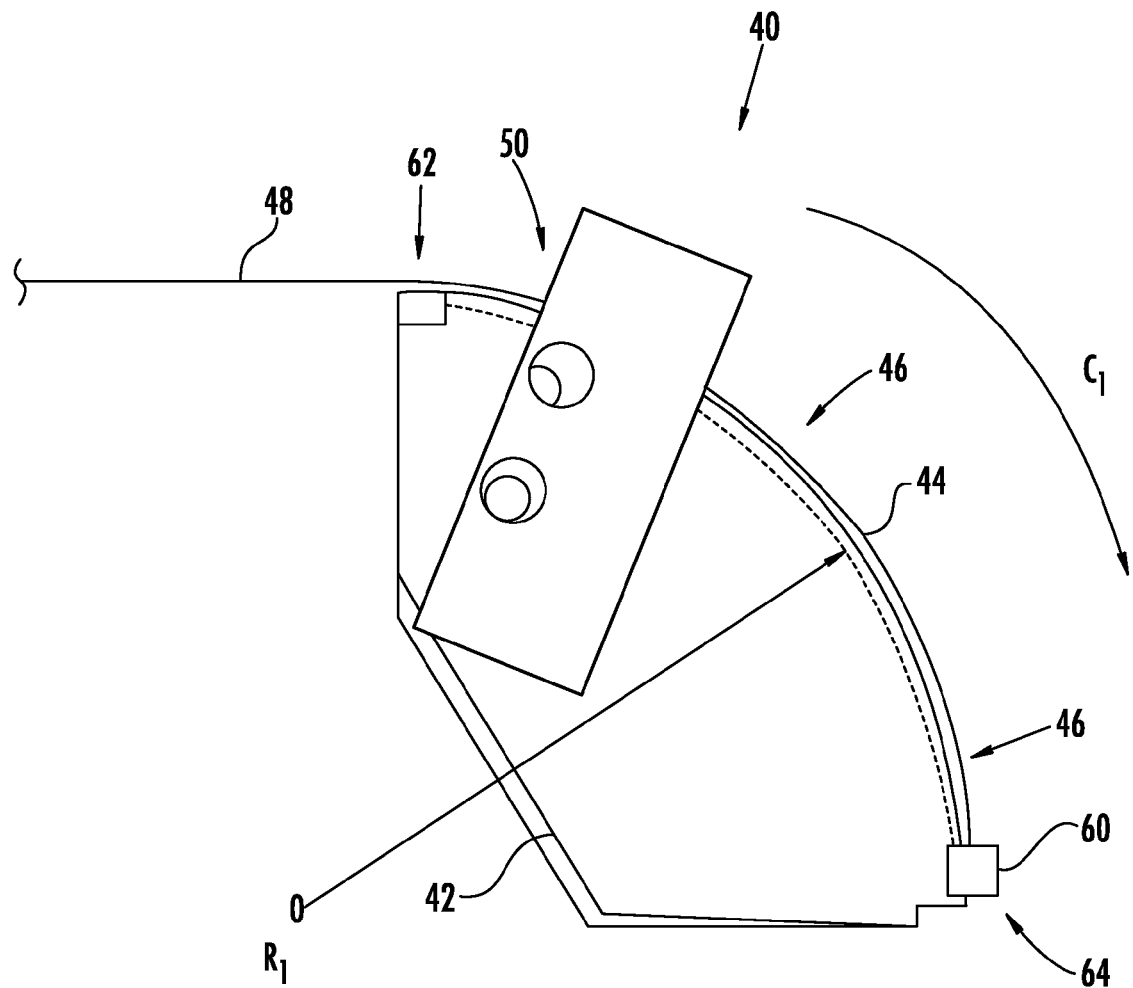
FIG. 4 is a side view of the bladeless cleaver of FIG. 3 with a portion of an optical fiber inserted into a fiber stripper disposed in the bladeless cleaver and disposed along a guide surface of the bladeless cleaver.

As illustrated in FIG. 3, the bladeless cleaver 40 includes a body 42. The body 42 supports other components of the bladeless cleaver 40 as will be described below. The body 42 contains a guide surface 44 to guide a portion 46 of an optical fiber 48 to be cleaved, as illustrated in FIG. 4. The optical fiber 48 may have any of the attributes of the optical fiber 10 discussed above with regard to FIGS. 1 and 2, as an example. In this embodiment, the guide surface 44 is an arcuate surface of radius $R_1$ for placing a bend in the portion 46 of the optical fiber 48 prior to cleaving the portion 46 of the optical fiber 48. However, the guide surface 44 is not required to be an arcuate surface. If the guide surface 44 is arcuate, the guide surface 44 may be of any radius desired.

Figure 6:
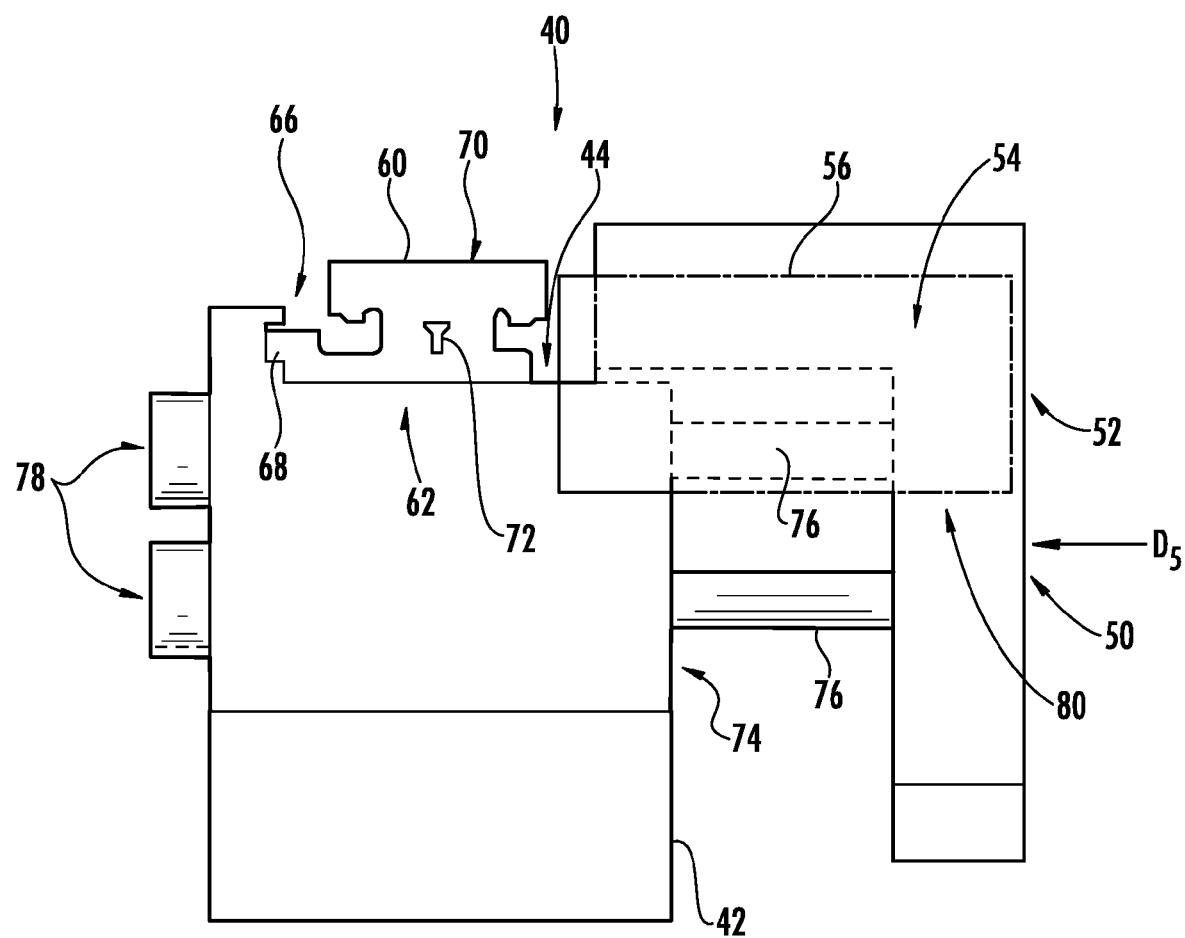
FIG. 6 is a left view of the bladeless cleaver of FIG. 3 prior to insertion of an optical fiber into a clamp of the fiber stripper.
Figure 8:
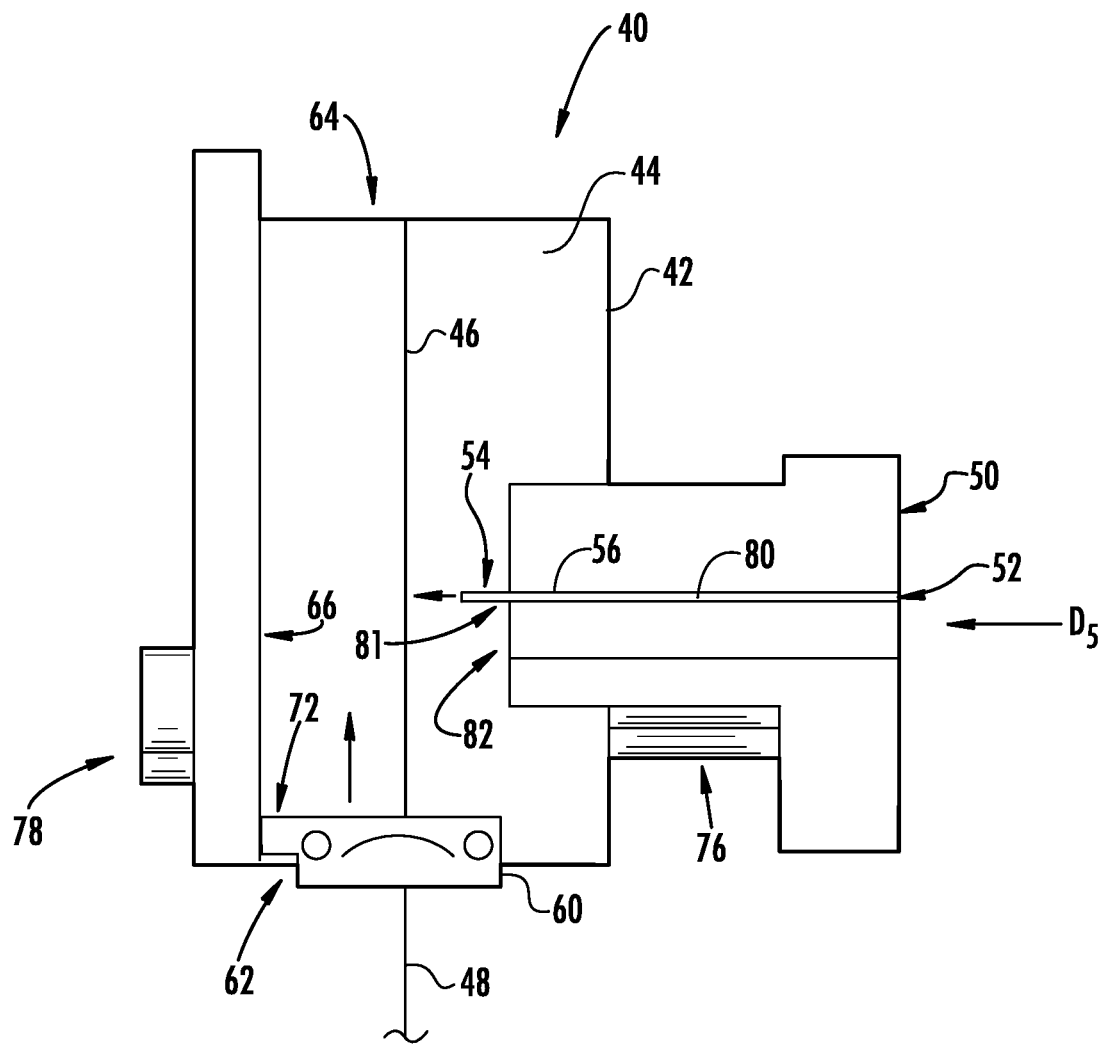
FIG. 8 is a top view of the bladeless cleaver and optical fiber illustrated in FIG. 7.

A cleaver structure 50 is attached to the body 42 and contains an abrasive medium structure 52 configured to support an abrasive medium 54, as illustrated in FIGS. 6 and 8. As will be described in more detail below, the cleaver structure 50 is configured to be actuated to place the abrasive medium 54 in contact with the portion 46 of the optical fiber 48 to create a flaw in the portion 46 of the optical fiber 48. The abrasive medium 54 may have any of the characteristics of the abrasive medium 20 discussed above with regard to FIGS. 1 and 2. Further, the abrasive medium 54 may be disposed on a carrier 56, as illustrated in FIGS. 6 and 8. The carrier 56 may have any of the characteristics of the carrier 22 discussed above with regard to FIGS. 1 and 2.

A fiber stripper 60 is optionally attached to the body 42 in this embodiment to strip coating from the portion 46 of the optical fiber 48 disposed about the guide surface 44 of the body 42. The fiber stripper 60 is used to strip coating from the portion 46 of the optical fiber 48 prior to the cleaver structure 50 placing the abrasive medium 54 in contact with the portion 46 of the optical fiber 48. When the portion 46 of the optical fiber 48 is initially disposed about the guide surface 44 of the body 42, the fiber stripper 60 is disposed at a first end 62 of the guide surface 44, as illustrated in FIG. 3. The portion 46 of the optical fiber 48 may then be disposed around the entire guide surface 44 until the portion 46 of the optical fiber 48 reaches a second end 64 of the guide surface 44, as also illustrated in FIG. 3. Thereafter, the fiber stripper 60 may be aligned and secured to the portion 46 of the optical fiber 48 to prepare the same for stripping. In other words, the optical fiber 48 is inserted onto fiber stripper 60 so that an end of the optical fiber 48 extends a suitable distance therein, such as to second end 64 when the fiber stripper 60 is disposed on the first end 62 of the guide surface 44. Thereafter, the fiber stripper 60 can then be translated when secured to the portion 46 of the optical fiber 48 circumferentially around the guide surface 44, noted as $C_1$ in FIG. 4, until the fiber striper 60 is disposed at the second end 64 of the guide surface 44, as illustrated in FIG. 4. As the fiber stripper 60 is translated, any coating disposed on the portion 46 of the optical fiber 48 is removed by fiber stripper 60.

Figure 5:
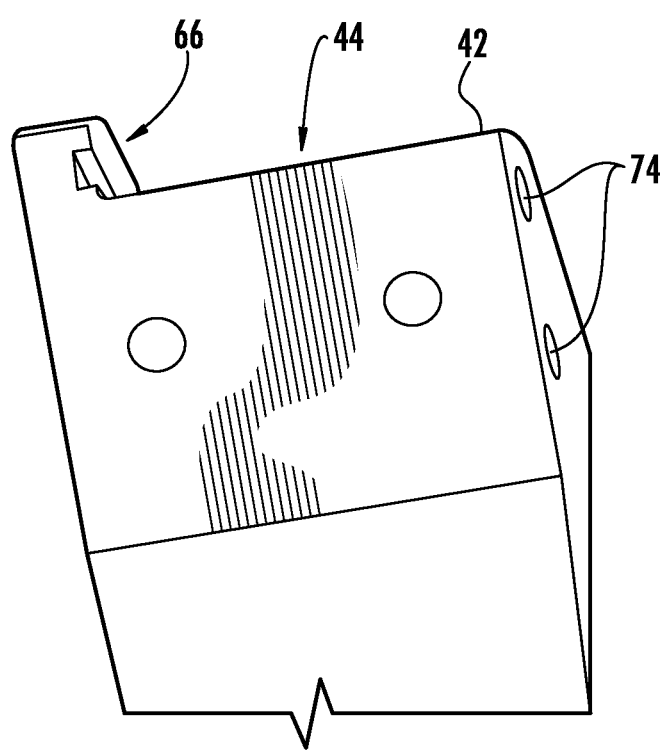
FIG. 5 is a left perspective view of the body of the bladeless cleaver of FIG. 3 illustrating a fiber stripper disposed in a track disposed along the guide surface of the bladeless cleaver to allow the fiber stripper to be translated about the guide surface to strip coating from the portion of the optical fiber.

By way of example, FIG. 5 illustrates the translation of the fiber stripper 60 circumferentially about the guide surface 44 to strip the portion 46 of the optical fiber 48. In this embodiment, a guide or track 66 is disposed in the body 42 of the bladeless cleaver 40 adjacent the guide surface 44. The track 66 is disposed around the radius $R_1$ of the guide surface 44 in this embodiment. The track 66 retains the fiber stripper 60 and allows the fiber stripper 60 to be secured to the body 42 as the fiber stripper 60 is translated circumferentially about the guide surface 44. This is further illustrated in FIG. 6 illustrating a left side view of the bladeless cleaver 40. As illustrated therein, the fiber stripper 60 is engaged to the track 66 in the body 42 at the first end 62 of the guide surface 44. The fiber stripper 60 contains a protrusion 68 that acts as a rail configured to engage with the track 66, but other suitable guide structures are possible.

The fiber stripper 60 in this embodiment also contains a clamp 70 to secure the fiber stripper 60 to the portion 46 of the optical fiber 48 prior to stripping in this embodiment, as illustrated in FIG. 6. In this embodiment, the clamp 70 is disposed in the fiber stripper 60, but such is not required. The clamp 70 illustrated in FIG. 6 is open to receive the portion 46 of the optical fiber 48. When the clamp 70 is open, the clamp 70 disposed in the fiber stripper 60 contains an opening 72 configured to receive the portion 46 of the optical fiber 48 when disposed therein. The portion 46 of the optical fiber 48 is inserted through the opening 72 when disposing the portion 46 of the optical fiber 48 around the guide surface 44 of the bladeless cleaver 40 (see also, FIG. 4). To secure the fiber stripper 60 to the portion 46 of the optical fiber 48, the clamp 70 is closed onto the portion 46 of the optical fiber 48 when the fiber stripper 60 is disposed at the first end 62 of the guide surface 44, as illustrated in the left side and top views of the bladeless cleaver 40 in FIGS. 7 and 8, respectively. When the clamp 70 is closed, the size of the opening 72 is reduced from when the clamp 70 is opened, as illustrated in FIG. 6, to secure the fiber stripper 60 to the portion 46 of the optical fiber 48. The opening 72 when the clamp 70 is closed is designed to be sized such that any coating on the portion 46 of the optical fiber 48 is removed when the fiber stripper 60 is translated circumferentially about the guide surface 44 to the second end 64 without damaging the glass of the optical fiber 48, as illustrated in the top view of the bladeless cleaver 40 in FIG. 9. The clamp 70 may also place a stress on the portion 46 of the optical fiber 48 prior to cleaving.

As discussed above and illustrated in FIGS. 3 and 4, the bladeless cleaver 40 includes the cleaver structure 50 attached to the body 42 to support the carrier 56 having the abrasive medium 54 disposed thereon. The cleaver structure 50 controls placing the abrasive medium 54 in contact with the portion 46 of the optical fiber 48 to induce a flaw therein, as described below. As illustrated in FIGS. 5 and 6, the body 42 contains openings 74 that are configured to support attachment of the cleaver structure 50 to the body 42. As illustrated in FIG. 6, two shafts 76, one hidden by the carrier 56 and one unobstructed, are disposed in the cleaver structure 50 to space apart the cleaver structure 50 from the body 42 when the cleaver structure 50 is attached to the body 42. The shafts 76 are disposed through the openings 74 in the body 42. Springs (not shown) are disposed inside the shafts 76, wherein the springs bottom out in blind holes 78 disposed on the opposite side of the body 42 from the openings 74. In this manner, the cleaver structure 50 is spring-actuated with the body 42.

The cleaver structure 50 can be actuated to be moved in a direction $D_5$ towards the body 42 and guide surface 44, as illustrated in FIGS. 6 and 8, by exerting a force on the cleaver structure 50 towards the body 42. The springs inside the shafts 76 are compressed as a result, and the cleaver structure 50 is moved against the body 42, as illustrated in the top view of the bladeless cleaver 40 in FIG. 10. When the force exerted on the cleaver structure 50 is released, the springs in the shafts 76 release their stored energy and the cleaver structure 50 is returned to its position in FIG. 6. Because the carrier 56 having the abrasive medium 54 disposed thereon is disposed in the abrasive medium structure 52 disposed in the cleaver structure 50, when the cleaver structure 50 is moved towards the body 42, the cleaver structure 50 places the abrasive medium 54 into contact with the portion 46 of the optical fiber 48 to induce a flaw in the portion 46 of the optical fiber 48. Due to the stress induced into the portion 46 of the optical fiber 48 by the clamp 70 of the fiber stripper 60 as previously discussed and illustrated in FIG. 4, the portion 46 of the optical fiber 48 is cleaved due to the bend disposed in the portion 46 of the optical fiber 48 and/or the stress due to the clamping of the portion 46 of the optical fiber 48 by the clamp 70.

To support the abrasive medium 54 in the cleaver structure 50, the abrasive medium structure 52 is disposed in the cleaver structure 50 in this embodiment. The abrasive medium structure 52 supports the carrier 56 containing the abrasive medium 54. Providing an abrasive medium structure 52 allows the abrasive medium 54 to be disposed within the bladeless cleaver 40 as opposed to having to be provided and handled separately by a technician from a cleaver. Thus, the alignment and contact of the abrasive medium 54 with the portion 46 of the optical fiber 48 is controlled by the cleaver structure 50 for quality and repeatability in cleaving.

Figure 7:
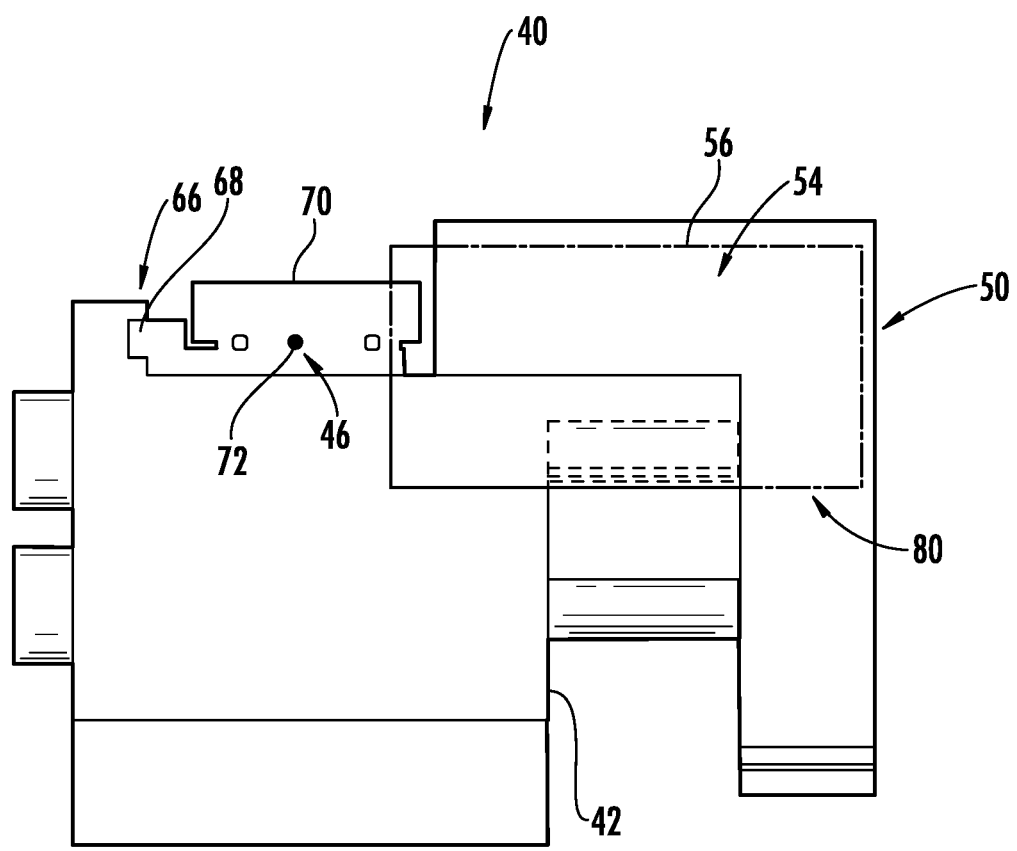
FIG. 7 is a left view of the bladeless cleaver of FIG. 3 after insertion of an optical fiber into the fiber stripper and the clamp of the fiber stripper closed.
Figure 9:
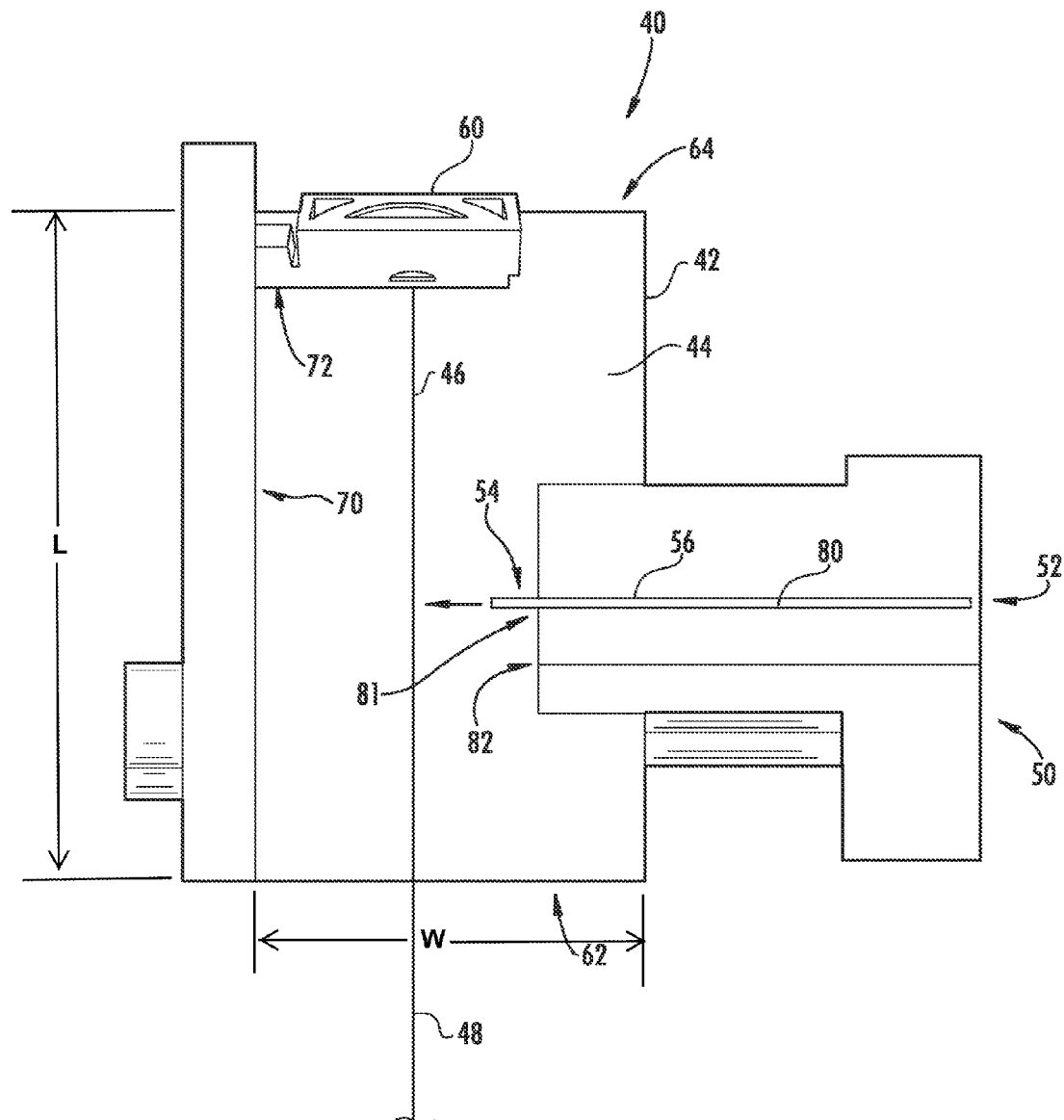
FIG. 9 is a top view of the bladeless cleaver of FIGS. 7 and 8 with the fiber stripper translated about the guide surface to strip the optical fiber clamped by the fiber stripper.
Figure 10:
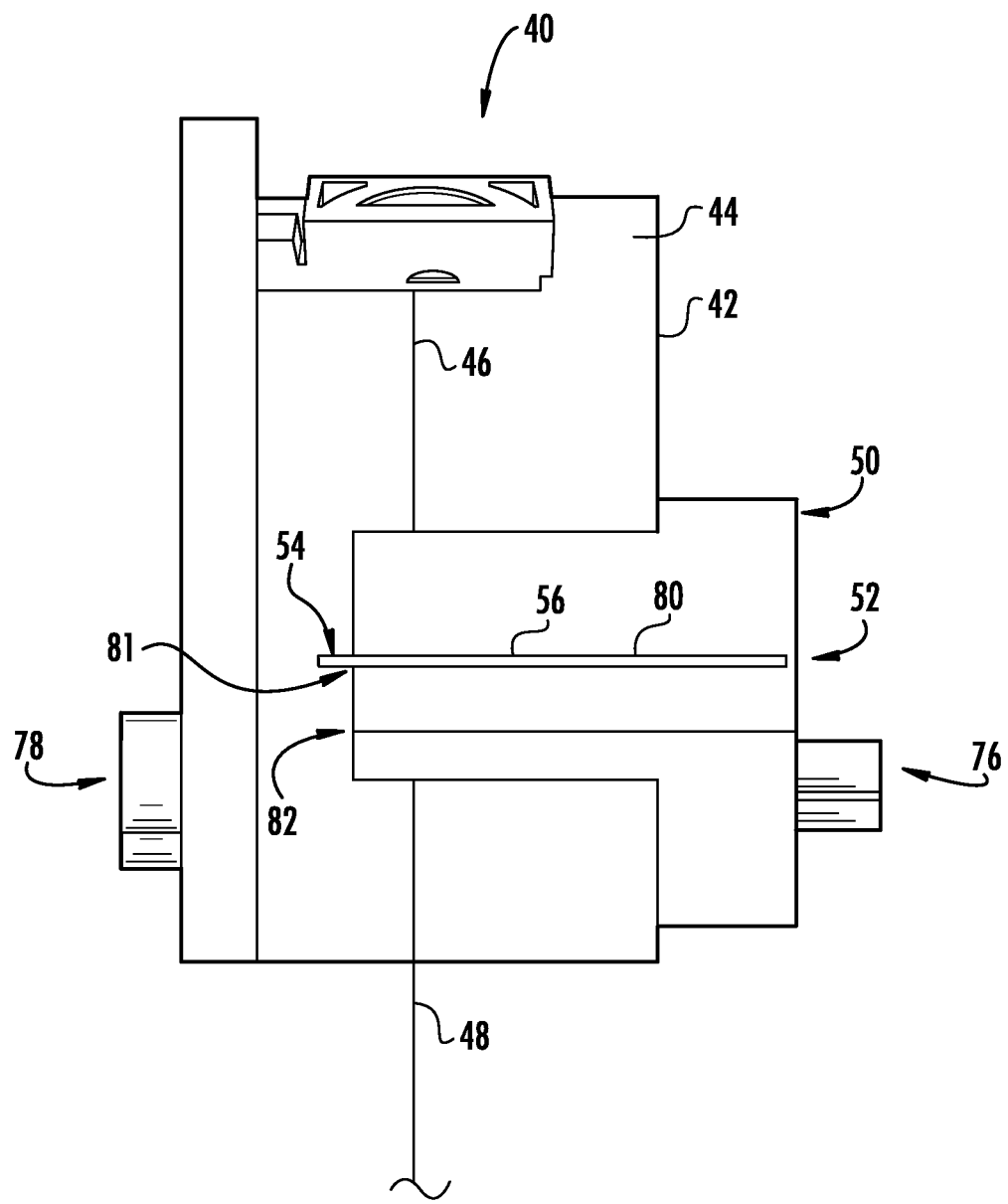
FIG. 10 is a top view of the bladeless cleaver of FIG. 9 with a cleaver structure supporting an abrasive medium actuated to place the abrasive medium in contact with a stripped portion of the optical fiber to create a flaw in the stripped portion of the optical fiber.

In this embodiment, as illustrated in the top views of the bladeless cleaver 40 in FIGS. 8-10, the abrasive medium structure 52 is provided in the form of an abrasive medium compartment 80. The abrasive medium compartment 80 is an opening 81 in this embodiment that is configured to allow the carrier 56 containing the abrasive medium 54 to be disposed therein. FIGS. 6 and 7 illustrated the carrier 56 inserted into the abrasive medium compartment 80 from a side view. The opening 81 does not extend all the way through the cleaver structure 50. Alternatively, the opening 81 could extend all the way through the cleaver structure 50. In this embodiment, the abrasive medium compartment 80 is disposed at an angle with respect to a tangent plane of the guide surface 44, although any orientation desired can be provided for the abrasive medium compartment 80 in the cleaver structure 50.

A technician can insert the carrier 56 containing the abrasive medium 54 prior to cleaving. The carrier 56 inserted into the abrasive medium compartment 80 extends beyond the opening 81 in the abrasive medium compartment 80 on a left side 82 of the cleaver structure 50 in this embodiment, as illustrated in FIGS. 8-10. The carrier 56 is designed and sized such that the abrasive medium 54 disposed thereon does not come into contact with the portion 46 of the optical fiber 48 disposed along the guide surface 44 when a force is not exerted against the carrier structure 50, as illustrated in FIGS. 8 and 9. However, when a force is exerted on the carrier structure 50, the sizing of the carrier 56 disposed in the abrasive medium compartment 80 is such that the abrasive medium 54 disposed on the carrier 56 comes into contact with the portion 46 of the optical fiber 48, thereby inducting a flaw, as illustrated in FIG. 10.

Figure 11:
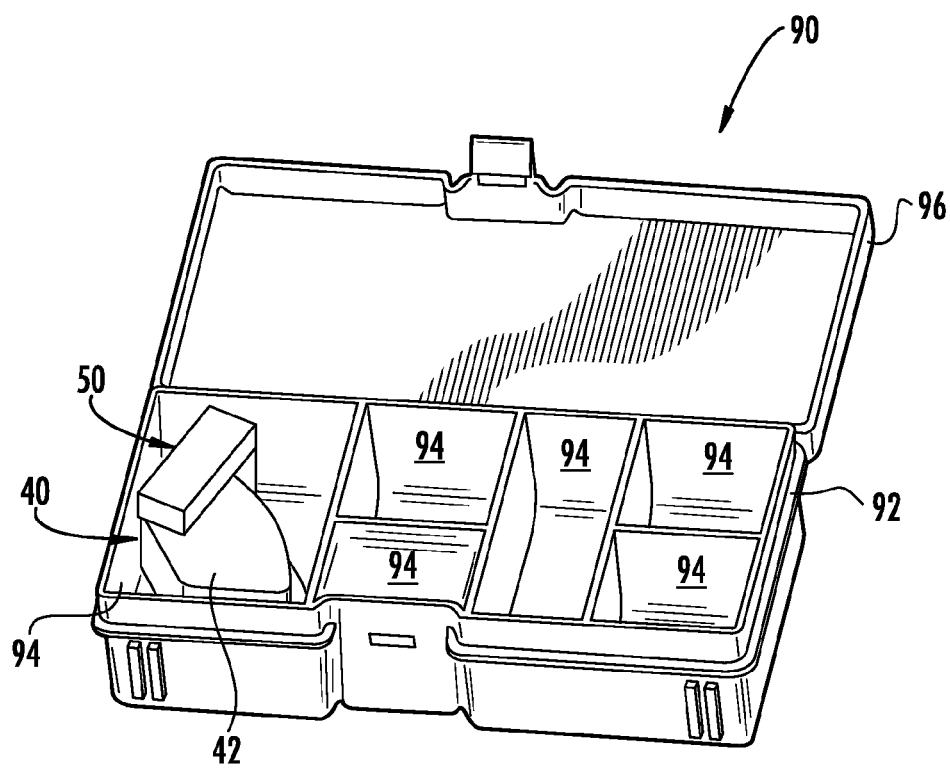
FIG. 11 is a front perspective view of the bladeless cleaver of FIG. 3 disposed in a compartment of a fiber optic package.

The bladeless cleaver 40 described above may be used by a technician to cleave an optical fiber to prepare an end face in the field to prepare a termination. For example, the termination may be prepared for splicing the optical fiber to another optical fiber or connectorizing the optical fiber. Preparing the termination may also include employing other components, such as connectors, crimp rings, boots, and other tools, as examples. In this regard, a fiber optic package 90 may be provided like illustrated in FIG. 11 as a convenient manner to store these components for easy transport and access by a technician. The fiber optic package 90 includes an enclosure 92 having a plurality of bins or compartments 94 for storing components used by the technician. A cover 96 may be attached to the enclosure 92 to close off access to the compartments 94 to protect the components stored therein. The bladeless cleaver 40 may also be stored in a compartment 94 of the fiber optic package 90, as illustrated in FIG. 11, as a convenient means to include a cleaver with the fiber optic package 90 containing other fiber optic components used to prepare and complete an optical fiber termination. Alternatively, a bladed cleaver may be stored in the compartment 94 of the fiber optic package 90.

Figure 12:
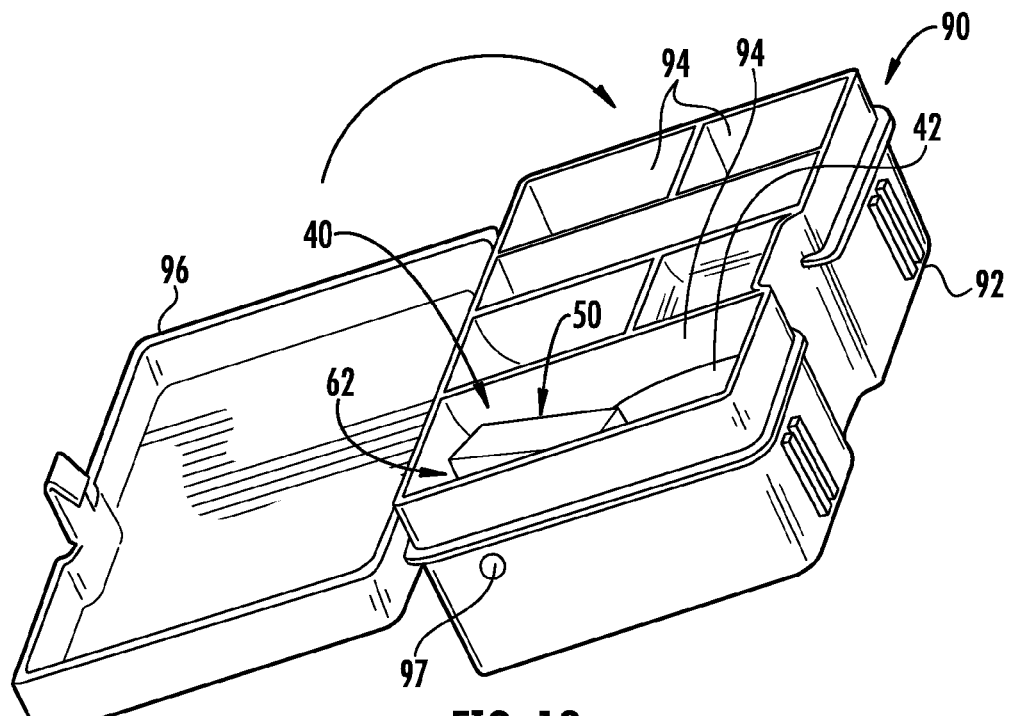
FIG. 12 is a left perspective view of the fiber optic package of FIG. 11 illustrating an opening disposed through the fiber optic package aligned with a guide surface disposed in the bladeless cleaver and configured to receive a portion of an optical fiber and direct the portion of the optical fiber along the guide surface.
Figure 13:
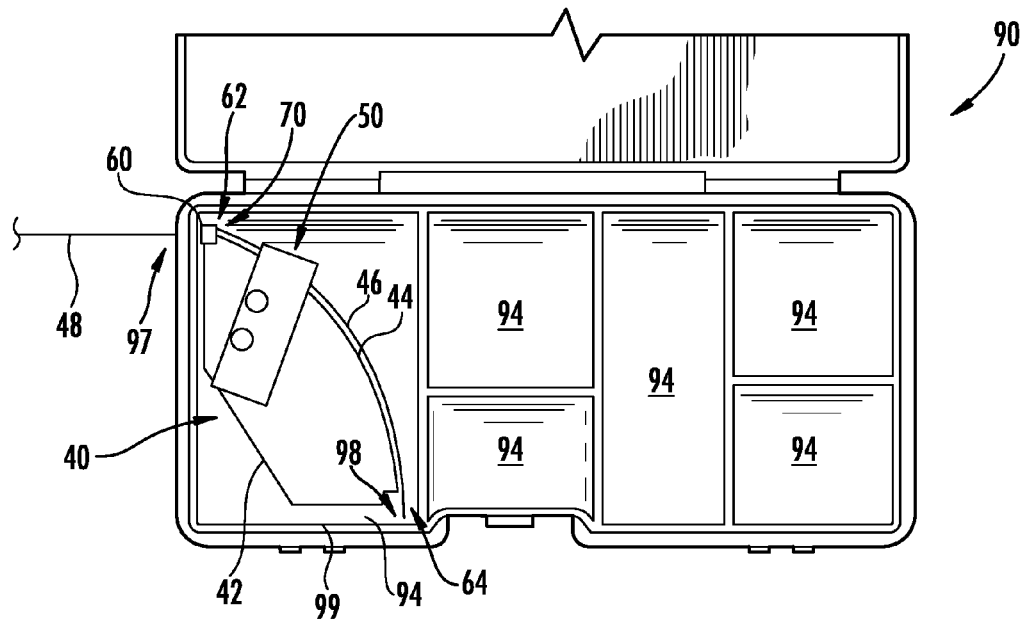
FIG. 13 is a top view of the fiber optic package of FIG. 11 with an optical fiber inserted through the opening of the fiber optic package and the fiber stripper and disposed along the guide surface of the bladeless cleaver.

For additional convenience, the fiber optic package 90 is configured to allow a technician to cleave an optical fiber without having to remove the bladeless cleaver 40 from the fiber optic package 90. In this regard, an opening 97 is disposed through the enclosure 92, as illustrated in FIG. 12. The opening 97 is disposed through the enclosure 92 to provide access to the compartment 94 containing the bladeless cleaver 40. The opening 97 in this embodiment is aligned with the first end 62 of the guide surface 44 of the bladeless cleaver 40. In this manner, when it is desired to cleave an optical fiber using the bladeless cleaver 40 disposed in the fiber optic package 90, the portion 46 of the optical fiber 48 is disposed through the opening 97 in the enclosure 92, as illustrated in FIG. 13. Because the opening 97 is aligned with the first end 62 of the guide surface 44, inserting the portion 46 of the optical fiber 48 through the opening 97 inserts the portion 46 of the optical fiber 48 through the fiber stripper 60. The bladeless cleaver 40 need not be removed from the fiber optic package 90. The portion 46 of the optical fiber 48 can be continued to be pushed through the opening 72 wherein the portion 46 is disposed along the guide surface 44 of the body 42, as previously described. The portion 46 of the optical fiber 48 can be continued to be disposed along the guide surface 44 until the portion 46 of the optical fiber 48 reaches a fiber stop 98, which in this embodiment is an interior wall 99 of the compartment 94 containing the bladeless cleaver 40, as illustrated in FIG. 13.

Figure 14:
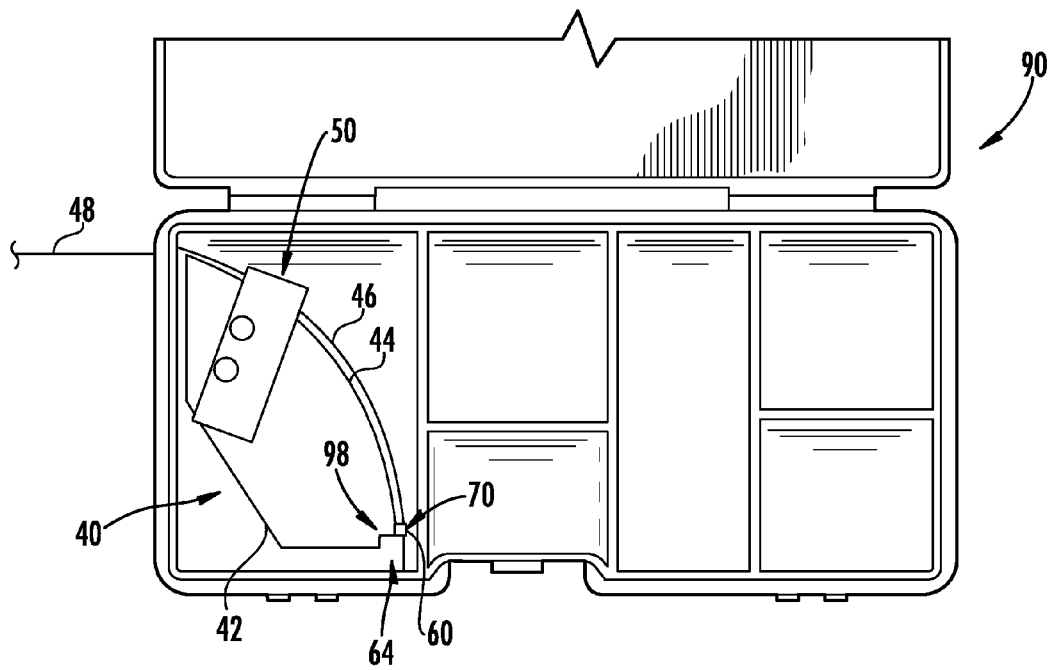
FIG. 14 is a top view of the fiber optic package of FIG. 11 with the fiber stripper of the bladeless cleaver translated about the guide surface to strip the optical fiber clamped by the fiber stripper.

Thereafter, the clamp 70 disposed in the fiber stripper 60 can be closed, as previously described. The portion 46 of the optical fiber 48 is then ready for stripping. In this regard and as previously described, the fiber stripper 60 can be translated about the guide surface 44 to strip coating from the portion 46 of the optical fiber 48. FIG. 14 illustrates the fiber stripper 60 translated to the second end 64 of the guide surface 44 adjacent to the fiber stop 98. The portion 46 of the optical fiber 48 can now be cleaved. In this manner, as previously discussed, a force can be exerted downward on the cleaver structure 50, as illustrated in FIG. 14, to cleave the portion 46 of the optical fiber 48. As previously discussed with regard to FIG. 10, exerting a force to push the cleaver structure 50 into the body 42 causes the abrasive medium 54 disposed on the carrier 56 disposed in the abrasive medium compartment 80 to come into contact with the portion 46 of the optical fiber 48. A flaw is introduced into the portion 46 of the optical fiber 48 as a result, thereby allowing the portion 46 of the optical fiber 48 to be broken about the flaw to create an end face in portion 46 of the optical fiber 48. The methods described above with regard to creating a flaw in an optical fiber employing the bladeless cleaver 40 to cleave an optical fiber may be employed when the bladeless cleaver 40 is disposed in the fiber optic package 90.

For convenience, the cleaver referenced above with regard to FIGS. 11-14 as being included in the compartment 94 of the fiber optic package 90 is the bladeless cleaver 40 of FIGS. 3-10. However, it is to be understood that any other cleaver, including a conventional bladed cleaver, may be included in the compartment 94 of the fiber optic package 90 in FIGS. 11-14. Such bladed cleaver can include a body, a guide surface disposed in the body to guide a portion of an optical fiber, and a cleaver structure attached to the body and comprising an abrasive medium structure configured to support an abrasive medium, wherein the cleaver structure further comprises an actuator configured to actuate with respect to the body to place the abrasive medium in contact with the portion of the optical fiber to create a flaw in the portion of the optical fiber.

Other embodiments of bladeless cleavers may be designed to allow a technician to engage a portion of an optical fiber to be cleaved, to place a bend in the portion of the optical fiber, and place an abrasive material in contact with the portion of the optical fiber to create a flaw in the portion of the optical fiber. Historically, cleaving of an optical fiber is accomplished by a unique, task dedicated tool that has the sole function of performing the cleave step. In other words, prior to the cleaving the optical fiber, there are a host of other steps and dedicated tools that remove the various coatings of a fiber optic cable to present bare glass to the cleaver for cleaving. Besides a handful of task dedicated tools, a by-product of the traditional process is scrap material that is generated during the process. The scrap material is typically dealt with by way of a dedicated trash container, which may be part of a consumables kit or other packaging that holds the consumable parts needed by the technician in the field. The assortment of tools used by the technician is generally housed in a toolkit, tool belt, or the like. In some embodiments, the bladeless cleavers of the type disclosed herein may be incorporated into a tool, toolkit, a consumables kit, or other apparatus or packaging that is used by a technician to establish an optical connection in the field. In this manner, the technician may be able to carry a reduced number of tools when cleaving an optical fiber.

Figure 15:
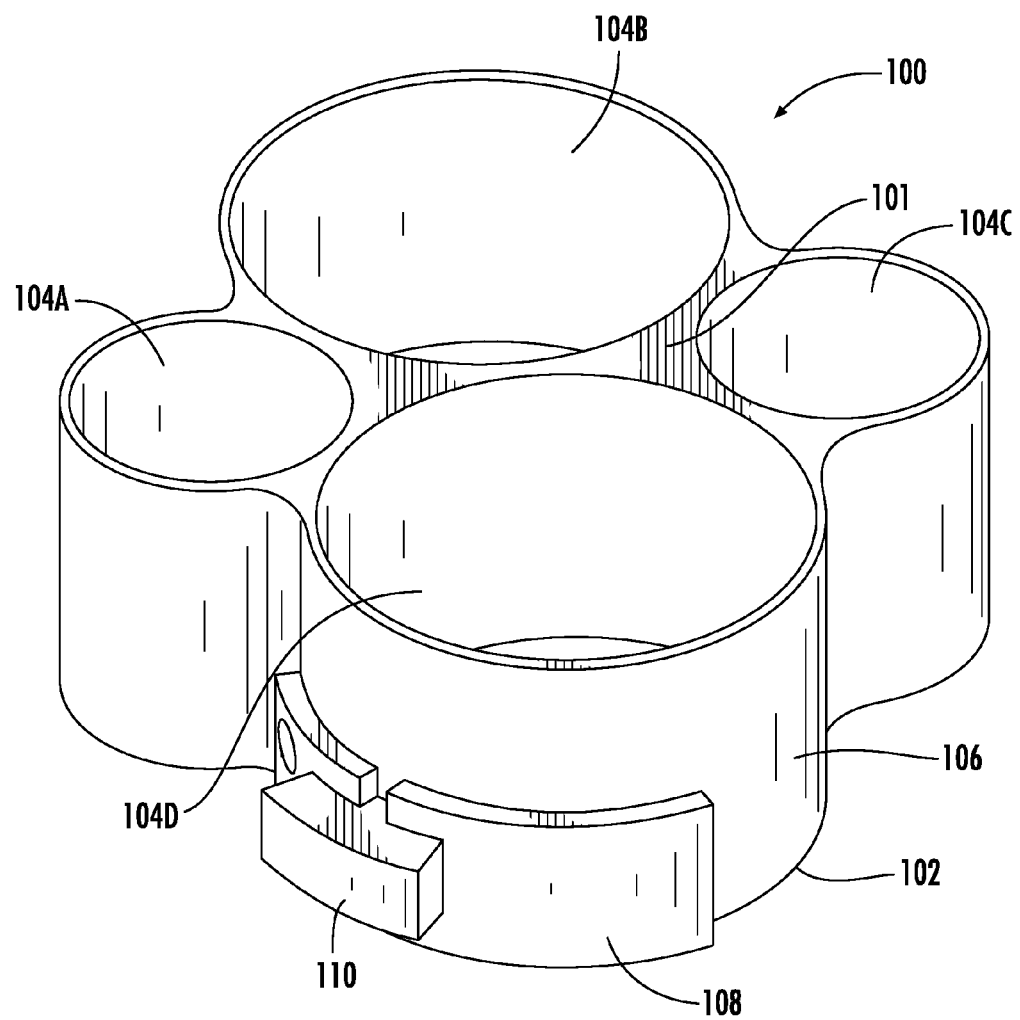
FIG. 15 is a side view of an alternate embodiment of an exemplary bladeless cleaver configured to place an abrasive medium in contact with a portion of the optical fiber to create a flaw in the portion of the optical fiber, where the exemplary bladeless cleaver is incorporated into a consumables kit.

In this regard, FIG. 15 is a side view of another exemplary bladeless cleaver 100. The bladeless cleaver 100 of FIG. 15 is incorporated into a consumables kit 101. The bladeless cleaver 100 of FIG. 15 is also configured to support an abrasive medium that is placed in contact with a portion of an optical fiber to cleave the optical fiber. Although the method of use of the bladeless cleaver 100 of FIG. 15 is described in more detail below, in general, the bladeless cleaver 100 of FIG. 15 may be used to cleave an optical fiber without employing a conventional cleaver blade. An optical fiber may be positioned in a space provided between a body of the bladeless cleaver 100 having an arcuate exterior surface and a cleaver structure disposed on the body. As used here, the term "a cleaver structure disposed on the body" includes, but is not limited to, embodiments where the cleaver structure may be proximate the body, adjacent the body, integrated into the body as a unitary piece (such as part of the same injection plastic mold, for example), or attached to the body as a separate piece.

The arcuate exterior surface of the body is configured to provide a bend in the portion of the optical fiber when the portion of the optical fiber is placed along the arcuate exterior surface. The cleaver structure comprises an abrasive medium carrier configured to support an abrasive medium. A flaw may then be created in a portion of the optical fiber by actuating the abrasive medium carrier attached to the body to place the abrasive medium in contact with the portion of the optical fiber to create a flaw in the portion of the optical fiber. The optical fiber may then be broken at the flaw to create a cleaved end face on the optical fiber.

As illustrated in FIG. 15, the bladeless cleaver 100 is incorporated into a consumables kit 101. Although FIG. 15 illustrates the bladeless cleaver 100 incorporated into a consumables kit 101, the bladeless cleaver 100 could be incorporated into any other tool, toolkit, or other packaging used by a technician in the field. The bladeless cleaver 100 includes a body 102 in this embodiment. The body 102 may be made of any material. In one embodiment, the body 102 may be plastic, including but not limited to injection molded plastic. The bladeless cleaver 100 may also include a plurality of compartments 104A-104D. The compartments 104A-104D may be used to hold various consumables to be used to prepare an optical fiber for cleaving, including but not limited to standard hand tools (i.e., screwdrivers, hammers, fiber optic buffer and coating strippers, box knifes, copper "can" tools, electrical tape dispensers, tape measures, etc.), cleaning solution, wipes, compressed air, and the like. In addition, in one embodiment, one of the compartments 104A-104D may be used as a receptacle for trash, such as scrap portions of optical fibers.

Figure 16A:
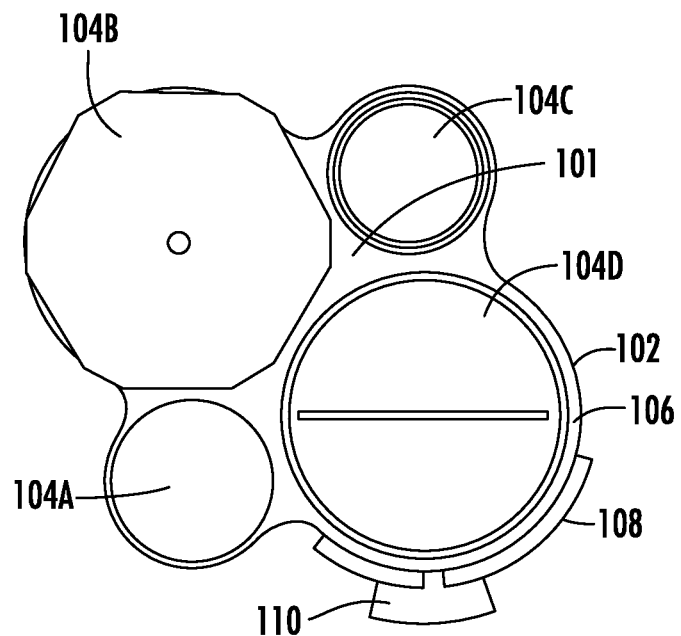
FIG. 16A is a top view of the bladeless cleaver of FIG. 15.
Figure 16B:
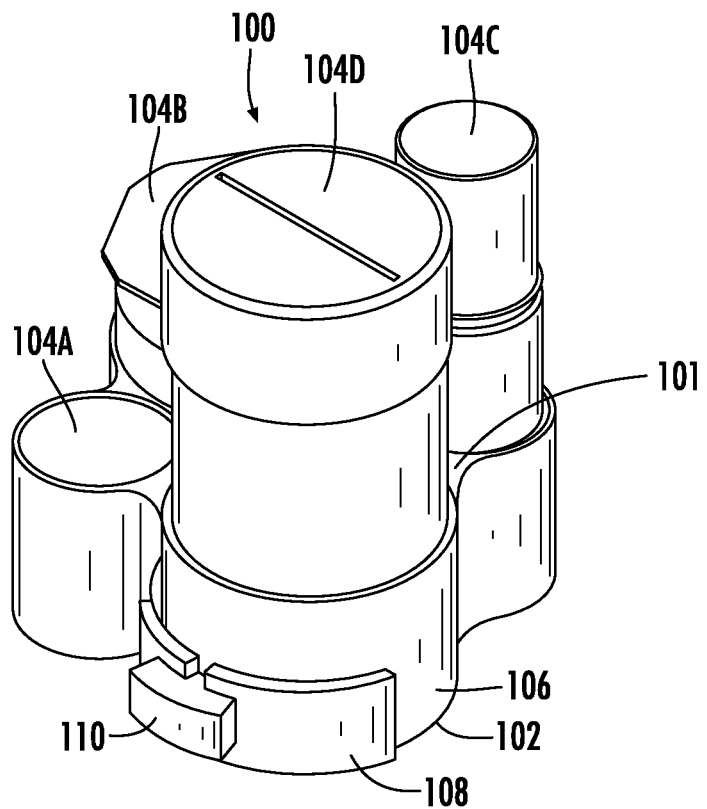
FIG. 16B is a side view of the bladeless cleaver of FIG. 15 illustrating how compartments of the consumables kit may be used.

In this regard, FIG. 16A is a top view of the bladeless cleaver 100 of FIG. 15. FIG. 16B is a side view of the bladeless cleaver 100 of FIG. 15 illustrating how the compartments 104A-104D may be used. In FIGS. 16A and 16B, the compartment 104A may be used to hold tools, optical connectors, or other parts. The compartment 104B contains wipes for cleaning an optical fiber in this embodiment. The compartment 104C in FIGS. 16A and 16B is used for holding a fiber cleaning solution. The compartment 104D in this embodiment is a receptacle for trash, such as scrap portions of optical fibers.

Referring back to FIG. 15, the body 102 includes at least one arcuate exterior surface 106. The arcuate exterior surface 106 is configured to provide a bend in a portion of an optical fiber when the portion of the optical fiber is placed along the arcuate exterior surface 106. A cleaver structure 108 is disposed on the body 102 and includes an abrasive medium carrier 110. In the embodiment shown in FIG. 15, the cleaver structure 108 is an integrated portion of the body 102. In another embodiment, the cleaver structure 108 may be a separate piece that is attached to the body 102 by any known manner. In any of the embodiments disclosed herein, the cleaver structure 108 may be made of any material, including but not limited to metal or plastic (including injection molded plastic). The cleaver structure 108 is disposed on the body 102 such that a space between the arcuate exterior surface 106 of the body 102 and the cleaver structure 108 is configured to receive a portion of an optical fiber. As will be described in more detail below, the abrasive medium carrier 110 may include an abrasive medium. The abrasive medium carrier 110 is configured to be actuated to place the abrasive medium in contact with a portion of an optical fiber to create a flaw in the portion of the optical fiber. Although the embodiment shown in FIGS. 16A and 16B shows the cleaver structure 108 integrated as part of, or attached to, the compartment 104D, which is a receptacle for trash, the cleaver structure 108 could be integrated into, or attached to, one of the other compartments 104A-104C.

Figure 17:
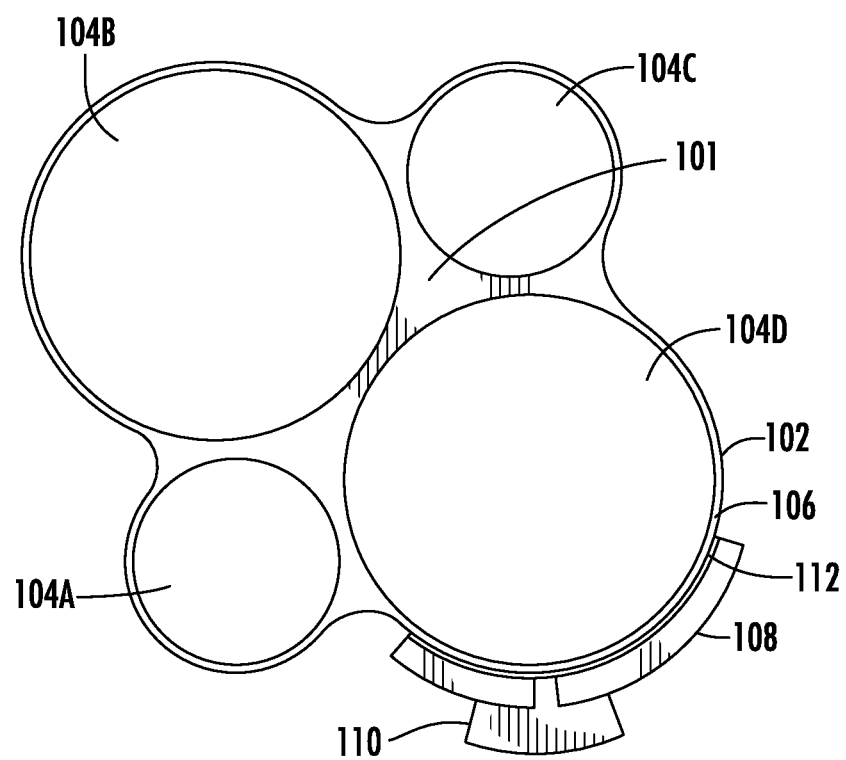
FIG. 17 is another top view of the bladeless cleaver of FIG. 15.

For example, with reference to FIG. 17, which is a top view of the bladeless cleaver 100 of FIG. 15, the cleaver structure 108 is disposed on the body 102 such that a space 112 is formed between the arcuate exterior surface 106 of the body 102 and the cleaver structure 108. The space 112 is configured to receive a portion of an optical fiber. In one embodiment, the space 112 may include a track, groove, or channel (not shown) to help guide the portion of the optical fiber, although such structure is not required. In one embodiment, where the cleaver structure 108 is an integrated portion of the body 102, the space 112 may be formed when the body 102 and the cleaver structure 108 are formed, such as by injection molding. In another embodiment, where the cleaver structure 108 may be a separate piece that is attached to the body 102, the cleaver structure 108 is attached to the body 102 such that the space 112 is of a size and shape suitable for receiving a portion of an optical fiber.

In the embodiment shown in FIG. 17, the abrasive medium carrier 110 operates by sliding up (in a direction out of the page) such that the abrasive medium is placed into contact with a portion of an optical fiber disposed in the space 112 to create a flaw in the portion of the optical fiber for cleaving the optical fiber.

Figure 18A:
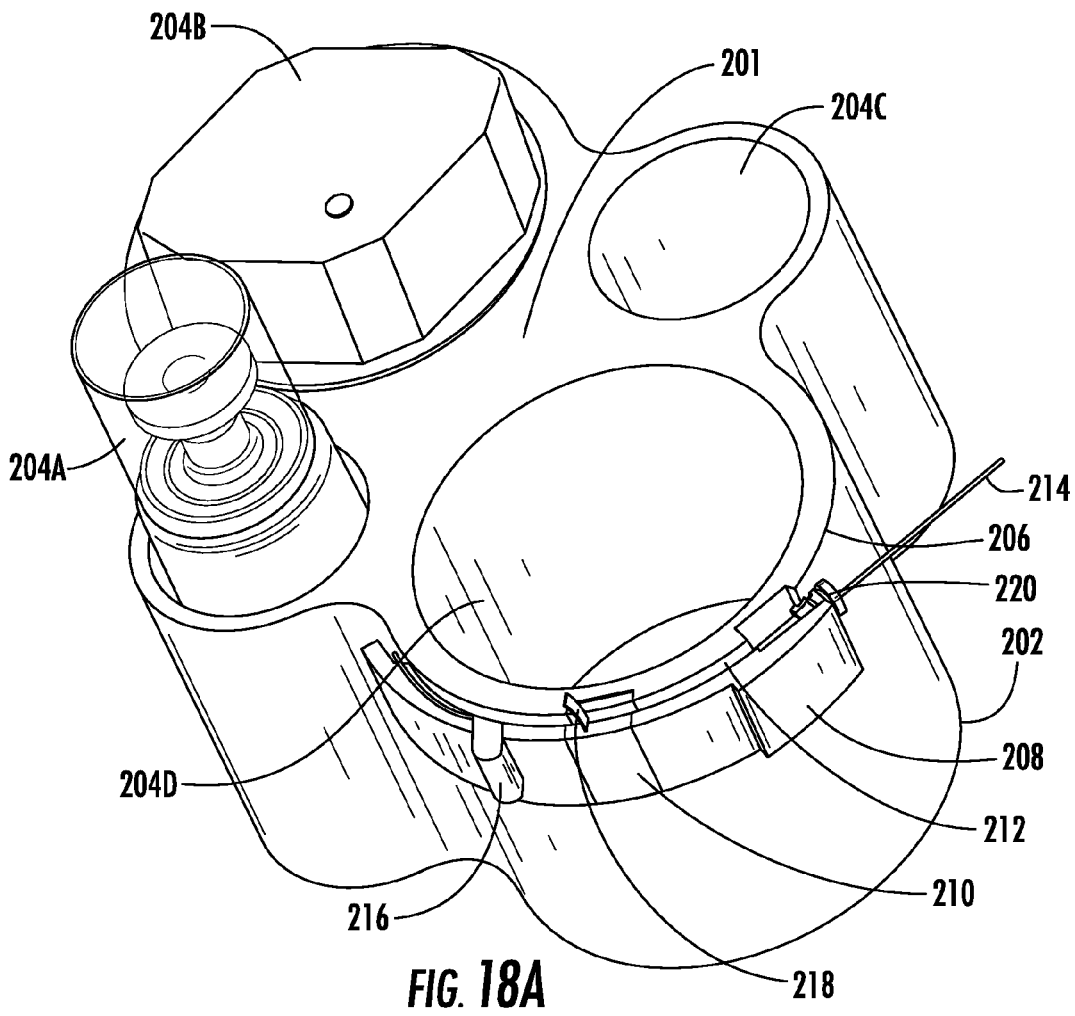
FIG. 18A is a side view of an alternate embodiment of an exemplary bladeless cleaver incorporated into a consumables kit.

Referring now to FIG. 18A, an alternate embodiment of a bladeless cleaver 200 is illustrated as being incorporated into a consumables kit 201. Although FIG. 18A illustrates the bladeless cleaver 200 incorporated into a consumables kit 201, the bladeless cleaver 200 could be incorporated into any other tool, toolkit, or other packaging used by a technician in the field. The bladeless cleaver 200 includes a body 202. The body 202 may be made of any material. In one embodiment, the body 202 may be plastic, including but not limited to injection molded plastic. The bladeless cleaver 202 may also include a plurality of compartments 204A-204D, which are similar to, and used for the same purposes, as compartments 104A-204D described above with respect to FIGS. 15, 16A, and 16B.

The body 202 includes at least one arcuate exterior surface 206. A cleaver structure 208 is located on the body 202 and includes an abrasive medium carrier 210. As described above with respect to the cleaver structure 108 in FIG. 15, the cleaver structure 208 may be an integrated portion of the body 202, or may be a separate piece that is attached to the body 202 by any known manner. In any of the embodiments disclosed herein, the cleaver structure 208 may be made of any material, including but not limited to metal or plastic (including injection molded plastic). The cleaver structure 208 of FIG. 18A is disposed on the body 202 such that a space 212 is disposed between the arcuate exterior surface 206 of the body 202 and the cleaver structure 208. The space 212 is configured to receive a portion 213 of an optical fiber 214, as seen in FIG. 18B.

Figure 18B:
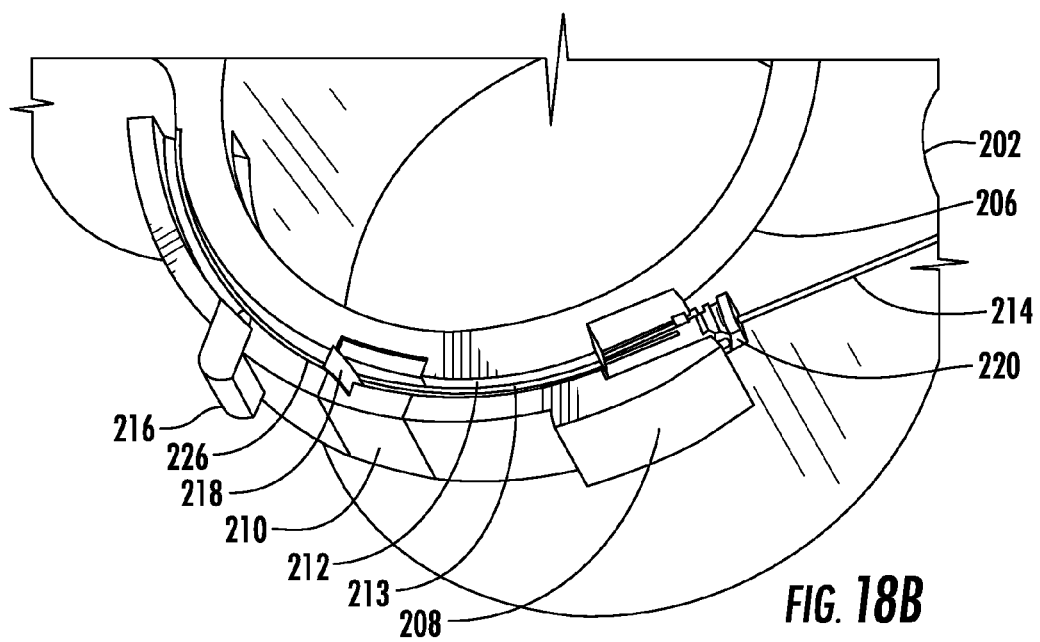
FIG. 18B is a close-up top view of the bladeless cleaver of FIG. 18A.

FIG. 18B is a top view of the bladeless cleaver 200 of FIG. 18A and provides a slightly closer view of the cleaver structure 208. The cleaver structure 208 includes the abrasive medium carrier 210. The abrasive medium carrier 210 includes an abrasive medium 218. In the embodiment of FIGS. 18A and 18B, the cleaver structure 208 also includes a clamp 216 and a fiber handler 220. After the portion 213 (as shown in FIG. 18B) of the optical fiber 214 is positioned in the space 212, the clamp 216 may be pushed forward toward the body 202 of the bladeless cleaver 200 in order to engage the portion 213 of the optical fiber 214 and provide a tension to the portion 213 of the optical fiber 214. The fiber handler 220 may be used to help guide or route the optical fiber 214 through the space 212 and around the arcuate exterior surface 206 of the body 202 such that a bend is placed in the portion 213 of the optical fiber 214.

As will be described in more detail below, the abrasive medium carrier 210 may include an abrasive medium 218. The abrasive medium carrier 210 is configured to be actuated to place the abrasive medium 218 in contact with the portion 213 of the optical fiber 214 to create a flaw in the portion 213 of the optical fiber 214. The bladeless cleaver 200 of FIG. 18A may also include a fiber handler, such as fiber handler 220, disposed in the space 212. The fiber handler 220 helps guide or route the optical fiber 214 through the space 212 and around the arcuate exterior surface 206 of the body 202 such that a bend is placed in the portion 213 of the optical fiber 214.

As may be seen in the embodiment shown in FIG. 18B, the abrasive medium 218 may be in the form of one or more tear away sheets of abrasive film. In other embodiments, the abrasive medium 218 may be similar to, and have any of the characteristics of, the abrasive medium 20 discussed above with regard to FIGS. 1 and 2. In addition, the abrasive medium 218 may be disposed on a carrier similar to carrier 56, as illustrated in FIGS. 6 and 8, where the carrier may have any of the characteristics of the carrier 22 discussed above with regard to FIGS. 1 and 2. In other embodiments, the abrasive medium 218 may be in the form of an index reel of media; a wire, string, or other thin strip of media; a block; or a body.

Figure 19A:
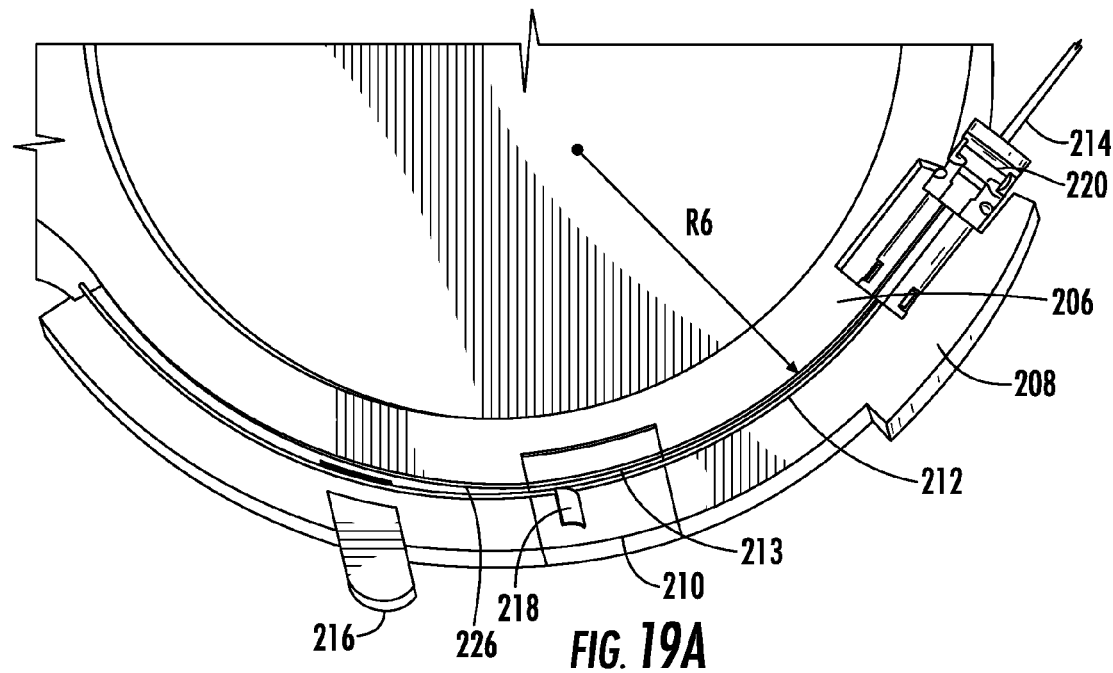
FIG. 19A is a close-up top view of a portion of the bladeless cleaver of FIGS. 18A and 18B prior to the cleaving of a portion of an optical fiber.
Figure 19B:
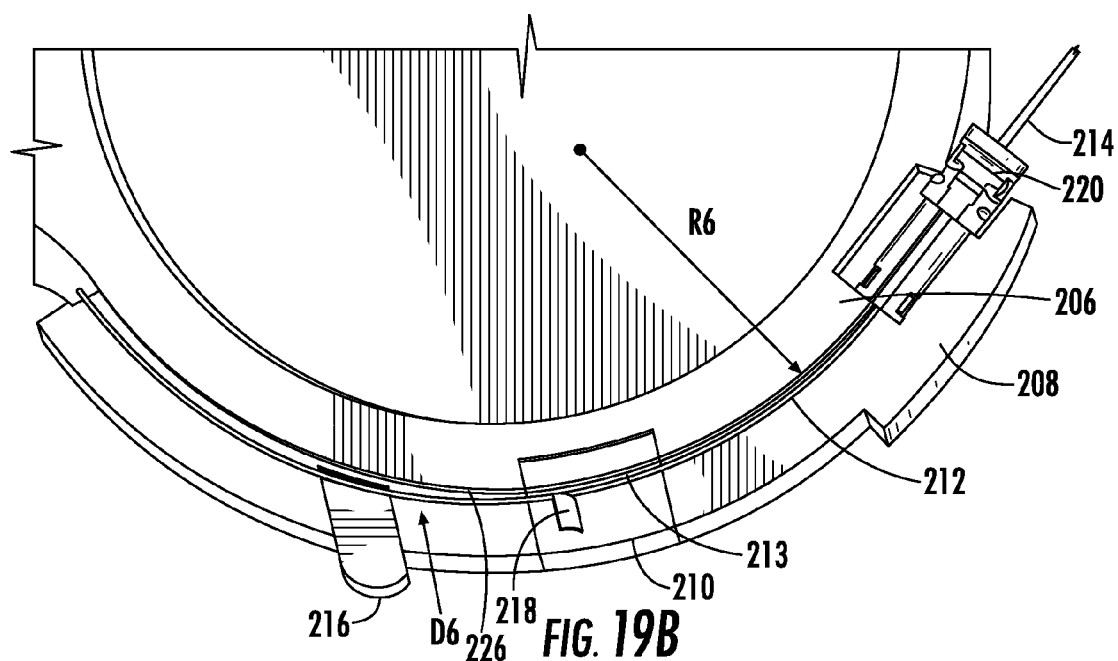
FIG. 19B is a close-up top view of a portion of the bladeless cleaver of FIGS. 18A and 18B after the cleaving process has begun.

Looking at FIGS. 19A and 19B together, the method of operation of the bladeless cleaver 200 to create a flaw in the portion 213 of the optical fiber 214 in order to create a cleaved end face on the optical fiber 214 may be as follows. FIG. 19A is a close-up top view of a portion of the bladeless cleaver 200 of FIGS. 18A and 18B, where the clamp 216 is shown in an open position. FIG. 19B is a close-up top view of a portion of the bladeless cleaver 200 of FIGS. 18A and 18B, where the clamp 216 is shown in a closed position. When the clamp 216 is in the open position as shown in FIG. 19A, a technician may position the optical fiber 214 into the space 212 between the cleaver structure 208 and the arcuate exterior surface 206 of the body 202 of the bladeless cleaver 200. Any coating disposed on the outside of the portion 213 of the optical fiber 214 may be removed (stripped) prior to placing the optical fiber 214 into the space 212 by any conventional stripper. The fiber handler 220 may be used to help guide or route the optical fiber 214 through the space 212 and around the arcuate exterior surface 206 of the body 202 such that a bend is placed in the portion 213 of the optical fiber 214. The space 212 may include a track, groove, or channel (not shown) to help guide the optical fiber 214 and hold the optical fiber 214 in place, although such a groove or channel is not required.

Once the portion 213 of the optical fiber 214 is positioned in range of the abrasive medium carrier 210, the technician may close the clamp 216 as shown in FIG. 19B by pushing the clamp 216 forward in a direction $D_6$ toward the body 202 of the bladeless cleaver 200. Closing the clamp 216 causes the clamp 216 to engage the portion 213 of the optical fiber 214 and provide a tension to the portion 213 of the optical fiber 214, as well as securing the optical fiber 214 in place. By so doing, the portion 213 of the optical fiber 214 is held in the space 212, bent around the arcuate exterior surface 206.

In this position, the arcuate exterior surface 206 of the body 202 provides a bend radius for the portion 213 of the optic fiber 214 to follow. In one embodiment, the radius provided by the arcuate exterior surface 206 of the body 202 may be of radius $R_6$. $R_6$ may be equivalent to $R_1$ as discussed above with respect to FIG. 4. The bend of radius $R_6$ in FIGS. 19A and 19B places a bend in the portion 213 of the optical fiber 214 prior to cleaving the optical fiber 214. In one embodiment, the radius $R_6$ may be between approximately three (3) and four (4) inches, although the bend radius $R_6$ may be of any radius desired.

The clamp 216 also applies tension to the portion 213 of the optical fiber 214, which may assist in introducing a flaw in the portion 213 of the optical fiber 214, which is necessary to make a cleave of the optical fiber 214, as discussed above.

With continuing reference to FIGS. 19A and 19B, once the portion 213 of the optical fiber 214 has tension applied to it as a result of the optical fiber 214 being bent around the arcuate exterior surface 206, the tension applied to the optical fiber 214 by the clamp 216, or both, the technician can actuate the abrasive medium carrier 210 such that the abrasive medium 218 is moved across the portion 213 of the optical fiber 214 to induce the flaw in the portion 213 of the optical fiber 214. In one embodiment, the abrasive medium carrier 210 may be controlled by human hand or a cleaving structure, as discussed above, to place the abrasive medium 218 in contact with the portion 213 of the optical fiber 214 to induce the flaw in the portion 213 of the optical fiber 214.

In the embodiment shown in FIGS. 19A and 19B, the abrasive medium carrier 210 comprises a pull tab of flexible sheets of film of abrasive media 218. The film may be a polishing film as a non-limiting example. In this embodiment, the technician pulls up on the pull tab of the abrasive medium 218 in order to score the portion 213 of the optical fiber 214 to induce the flaw in portion 213 of the optical fiber 214, as shown in more detail in FIGS. 20A and 20B. In this embodiment, where the abrasive medium 218 is provided in the form of tear away sheets of film, the bladeless cleaver 200 may be used multiple times, with the abrasive medium 218 being torn away one sheet of film at a time.

Figure 20A:
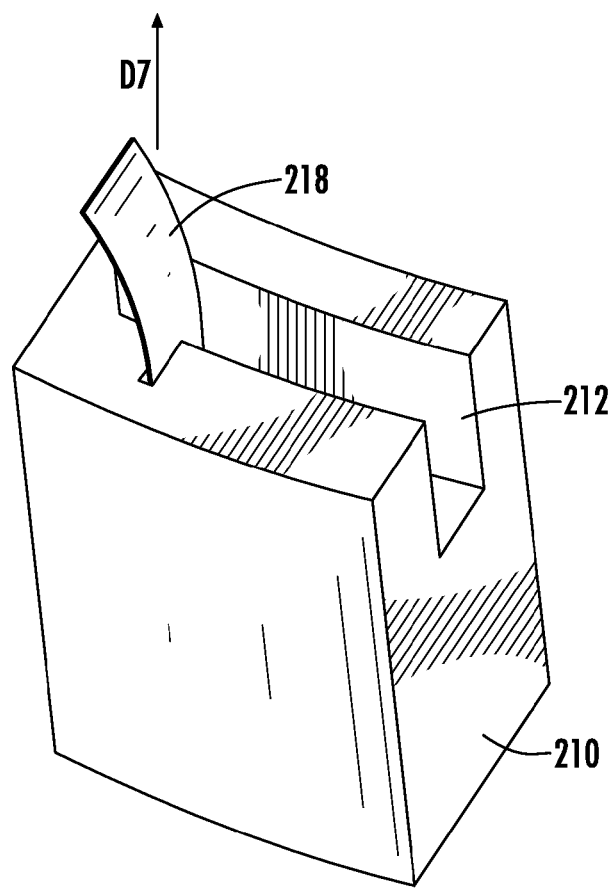
FIG. 20A is a side view of an exemplary abrasive carrier medium of the bladeless cleaver of FIGS. 18A, 18B, 19A, and 19B.

FIG. 20A is a side view of the abrasive carrier medium 210 of FIGS. 18A, 18B, 19A, and 19B. The abrasive carrier medium 210 comprises the abrasive medium 218. In order to cause the abrasive medium 218 to move across the portion 213 of the optical fiber 214 located in the space 212 (as shown in FIGS. 19A and 19B) to induce the flaw in the portion 213 of the optical fiber 214, the technician pulls the pull tab of the abrasive medium 218 upward in a direction $D_7$.

Figure 20B:
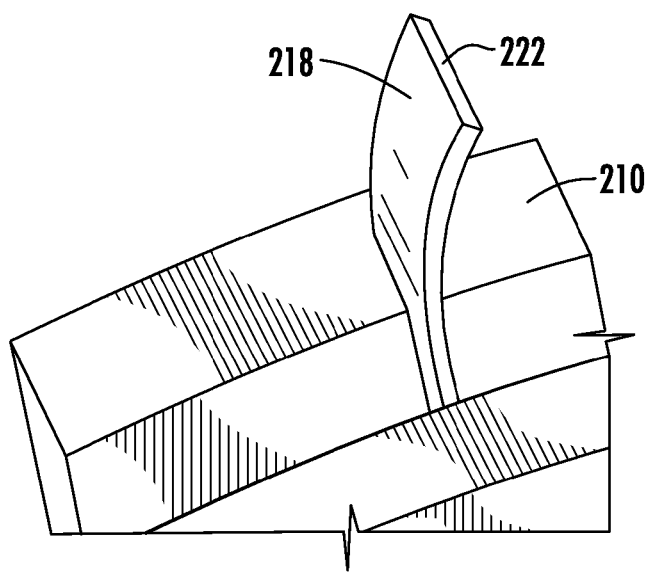
FIG. 20B is a close-up view of an exemplary abrasive medium supported by the abrasive medium carrier shown in FIG. 20A.

FIG. 20B is a close-up view of the abrasive medium 218 supported by the abrasive medium carrier 210 shown in FIG. 20A. The abrasive medium 218 has an edge 222 which actually scores, or cuts, the portion 213 of the optical fiber 214 shown in FIGS. 19A and 19B in order to introduce a flaw in the portion 213 of the optical fiber 214, which is necessary to make a cleave of the optical fiber 214, as discussed above.

In other embodiments, the abrasive medium carrier 210 may include an actuator for actuating the abrasive medium carrier 210 such that the abrasive medium 218 is placed into contact with the portion 213 of the optical fiber 214 bent around the arcuate exterior surface 206 to induce a flaw in the portion 213 of the optical fiber 214. The abrasive medium carrier 210 may be controlled in a swiping motion for example. In one embodiment, the actuator may be spring-actuated within the bladeless cleaver 200 in a manner similar to that illustrated in FIGS. 5 and 6.

The abrasive medium 218 may take any number of forms, similar to the abrasive medium 20 disclosed above with respect to FIG. 1. For example, the abrasive medium 218 may be material provided in grit form on the abrasive medium carrier 210. The abrasive medium 218 may be provided by any type of material or combination or compound of elements or materials. Non-limiting examples of the abrasive medium 218 include, but are not limited to, diamond, silicon carbide, aluminum oxide, silicon dioxide, cerium oxide, and ferrous oxide. The size of the abrasive medium 218 may be any size. As an example only, the size of the abrasive medium 218 may be between five (5) and twenty (20) micrometers (μm) as a non-limiting example. For example, the abrasive medium 218 may be fifteen (15) μm diamond, or eight (8) μm carbide, as non-limiting examples. The abrasive medium 218 may be disposed or deposited on the entire surface area of the film or only a portion of the surface area of the film. For example, the abrasive medium 218 may be disposed on an edge of the film.

In addition, the abrasive medium carrier 210 may be rigid or flexible. Providing a flexible abrasive medium carrier 210 allows a precise portion of the abrasive medium 218 disposed or deposited thereon to be placed into contact with the portion 213 of the optical fiber 214 to induce the flaw. Providing a flexible abrasive medium carrier 210 may also allow the deploying of the abrasive medium 218 in cleavers and other packagings that may not be possible or convenient if a conventional blade cleaver were employed. The abrasive medium 218 does not include a conventional sharp blade that can easily be placed into precise contact with an optical fiber.

In the embodiments where the abrasive medium 218 is disposed on sheets of film, the attachment of the film may be of low tolerance. In addition, the film comprising the abrasive medium 218 may be configured such that the film has a slight bow to it, which will translate into a downward force against the portion 213 (with exposed glass) of the optical fiber 214 during cleaving. The amount of the bow in one embodiment is enough to ensure that the film having the abrasive medium 218 is in contact with the portion 213 (with exposed glass) of the optical fiber 214 during as much of the swiping motion of the abrasive medium carrier 210 as possible. In this manner, the flexible film will allow the abrasive medium 218 to remain in contact with the portion 213 (with exposed glass) of the optical fiber 214 without having to maintain high tolerances for the location of the film.

Other non-limiting examples of carriers for the abrasive medium 218 include, but are not limited to, a wire, a string, a block, and a body. The abrasive medium carrier 210 may be of any size and made from any type of material desired, including but not limited to a polymer, plastic, and metal, as non-limiting examples. The quality and nature of the abrasive medium 218 and the abrasive medium carrier 210 determine the life or number of uses to cleave the optical fiber 214.

In any embodiment, when the abrasive medium carrier 210 is moved towards the body 202, the abrasive medium carrier 210 places the abrasive medium 218 into contact with the portion 213 of the optical fiber 214 bent around the arcuate exterior surface 206 of the body 202 to induce a flaw in the portion 213 of the optical fiber 214. The optical fiber 214 is cleaved due to the bend and tension disposed in the optical fiber 214 as a result of the arcuate exterior surface 206. In some embodiments, the clamp 216 holds the optical fiber 214 in place and also provides additional tension to the optical fiber 214 while the abrasive medium carrier 210 is moved upward in the direction $D_7$ towards the portion 213 of the optical fiber 214 bent around the arcuate exterior surface 206 to bring the abrasive medium 218 in contact with the portion 213 of the optical fiber 214. The swiping motion may be in a linear motion in the direction $D_7$, as shown in FIG. 20A, or may follow an arcuate path. Once the flaw is created, the tension and bend provided by the arcuate exterior surface 206, alone or in conjunction with the tension applied to the optical fiber 214 by the clamp 216, will propagate the cleave through the optical fiber 214 creating a usable end face.

When the cleave is made, the portion 213 of the optical fiber 214 to be used may be removed from the bladeless cleaver 200 by opening the clamp 216. A scrap portion 226 (as seen in FIGS. 18B, 19A, and 19B) of the optical fiber 214 will also remain held in place by the clamp 216 until the clamp 216 is opened.

Figure 21:
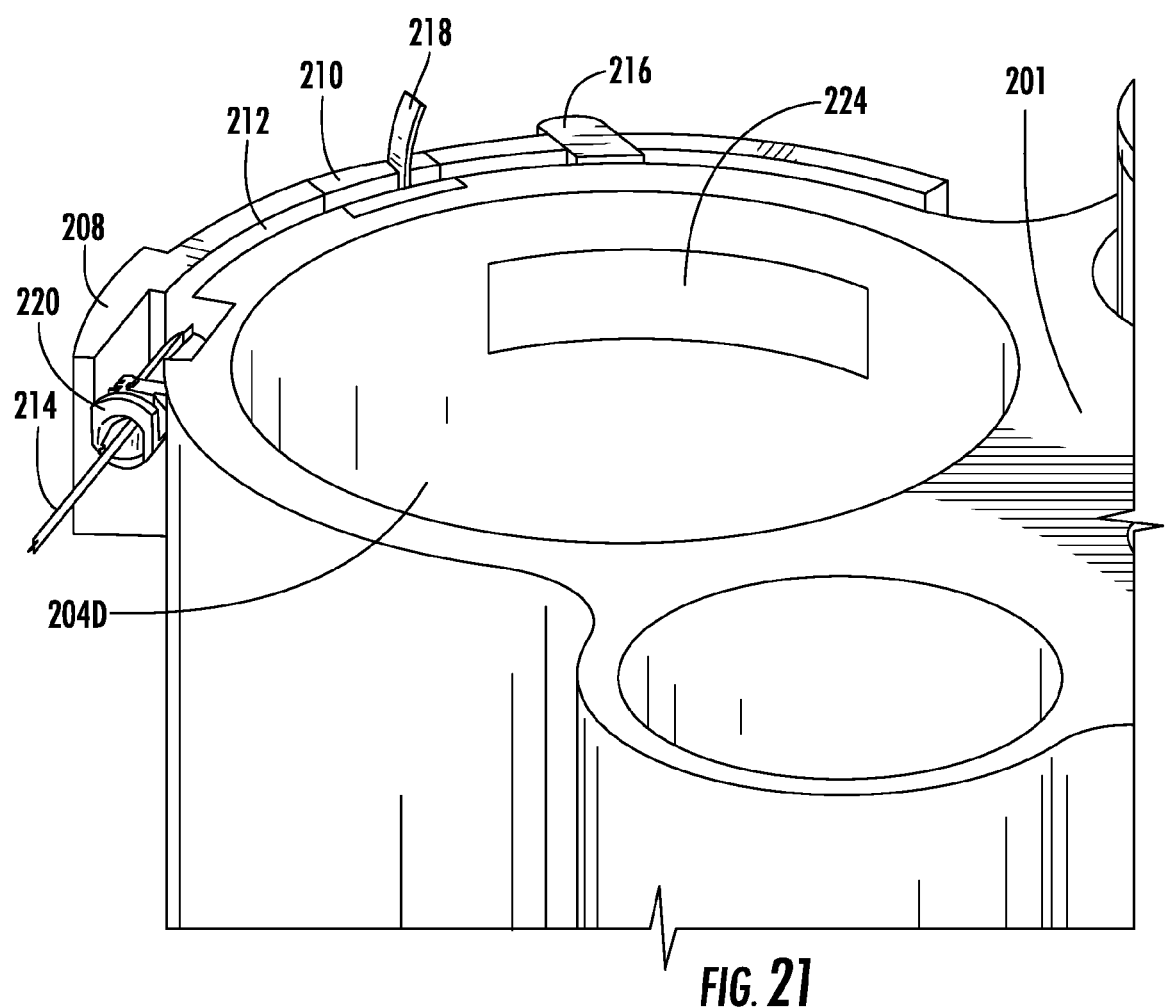
FIG. 21 is a close-up top view of an exemplary bladeless cleaver incorporated into a consumables kit that illustrates a compartment that may act as a receptacle for trash.

In one embodiment, as shown in FIG. 21, the compartment 204D, which is the receptacle for trash, may include an opening 224. The opening 224 is located at or below a bottom level of the cleaver structure 208. The opening 224 may remain open at all times, or it may be selectively opened. In one embodiment, the opening 224 may be selectively opened via the clamp 216. In any of these embodiments, when the clamp 216 is opened, the scrap portion 226 may automatically be deposited through the opening 224 into the compartment 204D for trash.

Figure 22A:
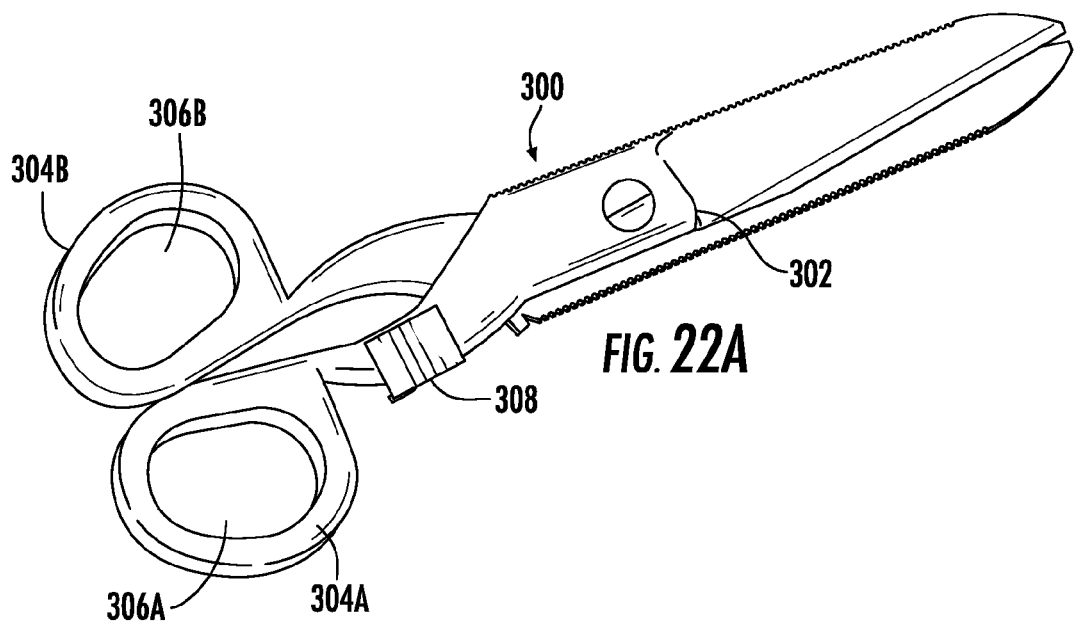
FIG. 22A shows an exemplary bladeless cleaver incorporated into a pair of scissors.

In other embodiments, the bladeless cleavers of the type disclosed herein may be incorporated into a tool or other apparatus that is used by a technician to establish an optical connection in the field. For example, a bladeless cleaver may be incorporated into a pair of scissors, as shown in FIGS. 22A-22D. FIG. 22A shows a bladeless cleaver 300 comprising a body 302 of a pair of scissors, which may be used by a technician in the field for a number of purposes. In this manner, when the technician is ready to cleave an optical fiber, the bladeless cleaver 300 in the form of the scissors is already available and makes the cleaving process easier, quicker, and more efficient. The bladeless cleaver 300 is configured to comprise a cleaver structure 308 incorporated into the body 302. In one embodiment, the cleaver structure 308 is an integrated portion of the body 302. In another embodiment, the cleaver structure 308 may be a separate piece that is attached to the body 302 by any known manner. In any of the embodiments disclosed herein, the cleaver structure 308 may be made of any material, including but not limited to metal or plastic (including injection molded plastic).

Figure 22B:
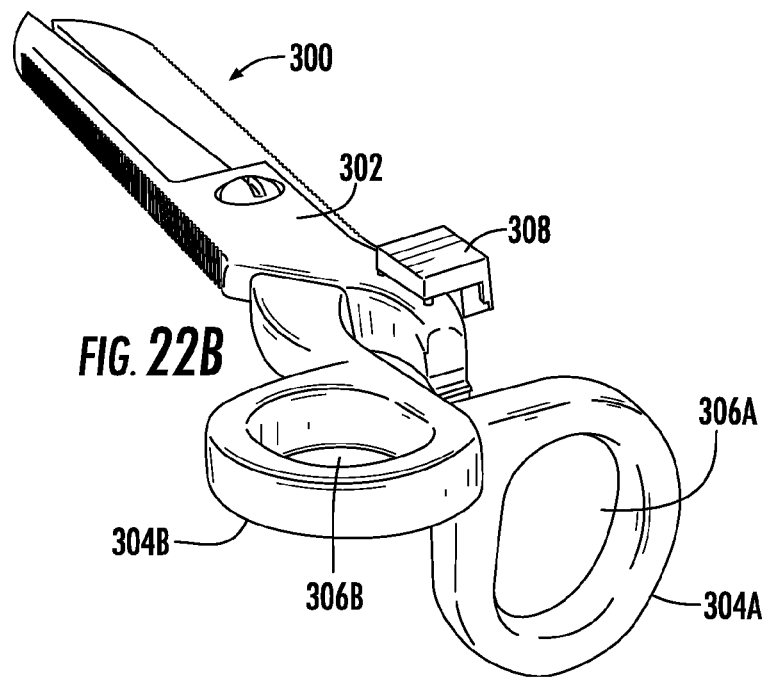
FIG. 22B shows the exemplary bladeless cleaver of FIG. 22A with a handle folded out.
Figure 22C:
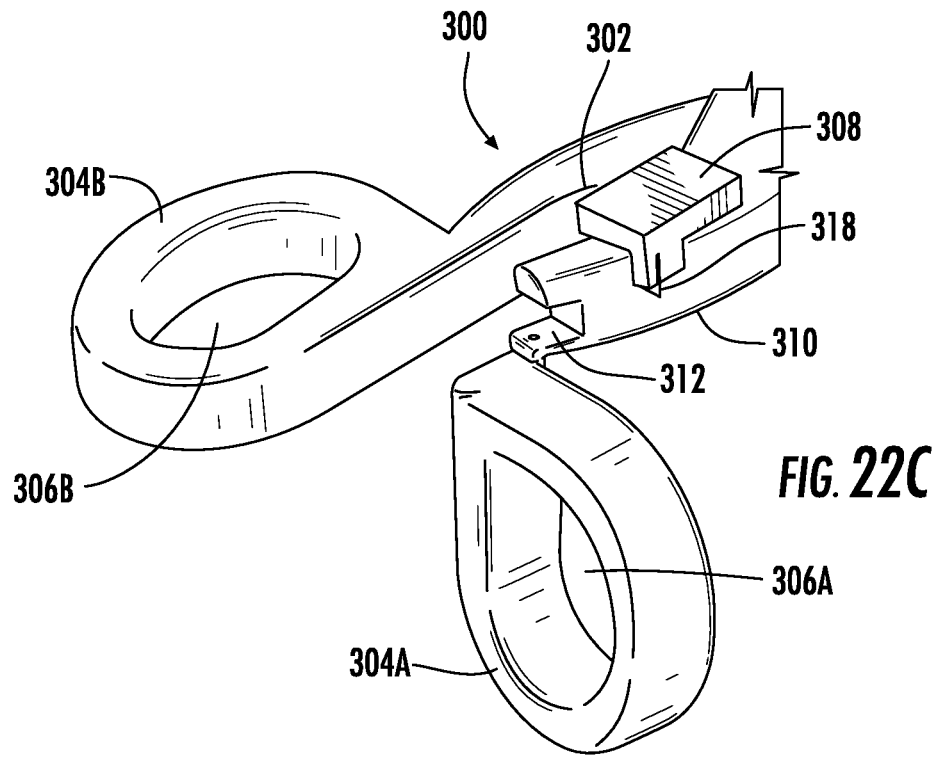
FIG. 22C shows the exemplary bladeless cleaver of FIG. 22A with a handle folded out to reveal a slot in the body of the exemplary bladeless cleaver configured to receive an optical fiber for cleaving.
Figure 22D:
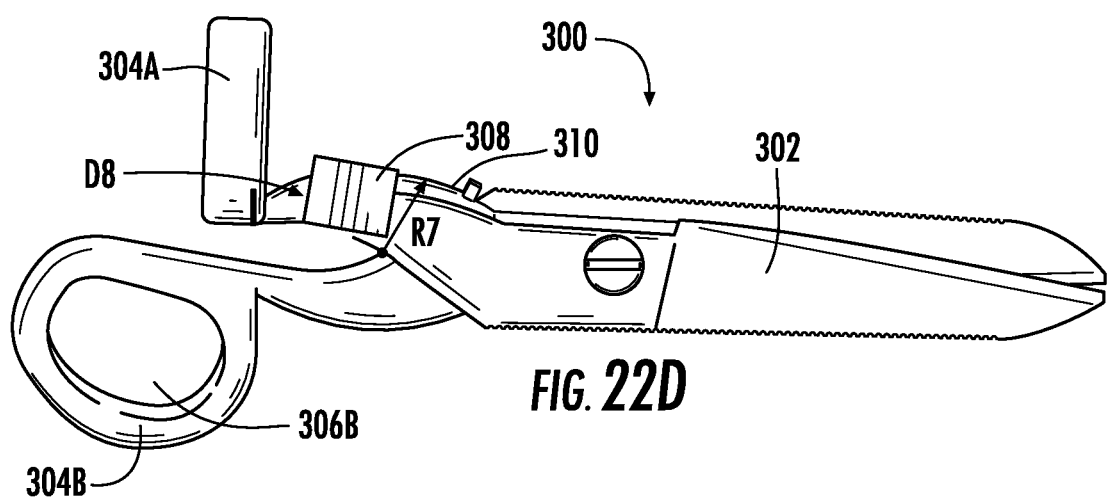
FIG. 22D shows the exemplary bladeless cleaver of FIG. 22A and illustrates how a fiber handler with an optical fiber may be inserted into a slot of the body of bladeless cleaver.

The bladeless cleaver 300 comprises a pair of handles 304A and 304B having a corresponding pair of finger holes 306A and 306B through which a technician may place one or more fingers (or thumb) in order to be able to securely handle the bladeless cleaver 300 during use. As shown in FIG. 22B, the handle 304A may be configured to fold out. Referring to FIG. 22C, the body 302 may include a slot 312. The handle 304A may be folded out such that the slot 312 in the body 302 is revealed. The slot 312 is configured to receive a fiber handler, such as the fiber handler 220 disclosed above with respect to FIGS. 18-21. The body 302 includes an arcuate exterior surface 310. Although FIG. 22A illustrates the bladeless cleaver 300 incorporated into a pair of scissors, the bladeless cleaver 300 could be incorporated into any other tool used by a technician in the field that has an arcuate exterior surface. The arcuate exterior surface 310 is configured to provide a radius for an optical fiber to follow or travel along for the purpose of cleaving the optical fiber.

As shown in FIG. 22C, the cleaver structure 308 may include an abrasive medium carrier 318. Looking at FIG. 22D, once the handle 304A is folded back, a fiber handler, such as the fiber handler 220 disclosed above with respect to FIGS. 18-21, may be inserted into the slot 312 (as shown in FIG. 22C) in a direction $D_8$ toward the body 302 of the bladeless cleaver 300. The arcuate exterior surface 310 of the body 312 provides a radius $R_7$ for an optical fiber to follow for cleaving. The cleaver structure 308 may be pressed down (into and out of the page) in order to place an abrasive medium disposed on the abrasive medium carrier 318 in contact with an optical fiber in order to introduce a flaw, which is necessary to cleave the optical fiber.

Figure 23:
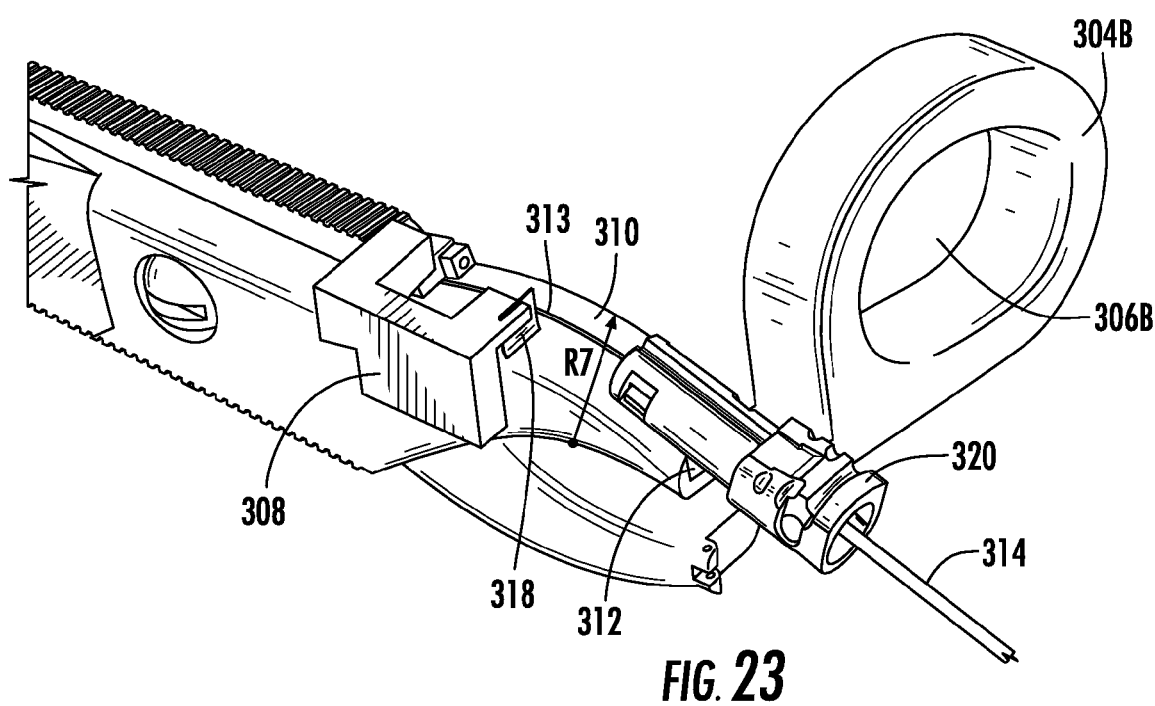
FIG. 23 is a close-up top view of a portion of the bladeless cleaver of FIGS. 22A-22D, where one of the handles is not shown for ease of viewing the cleaving process.
Figure 24:
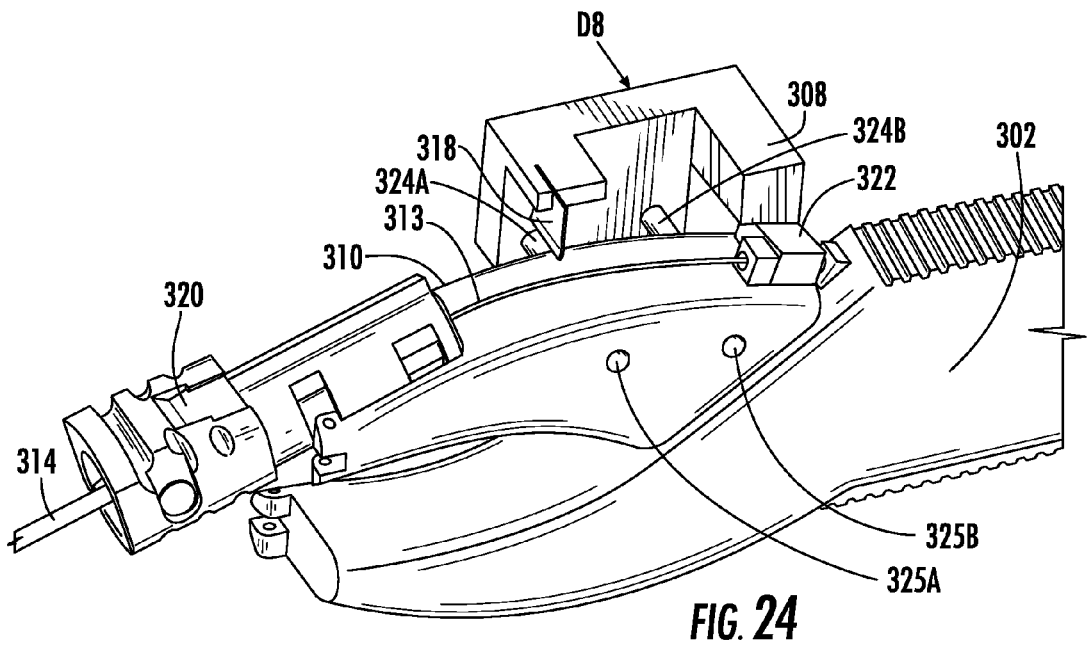
FIG. 24 is a top view of a portion of the bladeless cleaver of FIGS. 22A-22D that illustrates the method of operation of the bladeless cleaver to create a flaw in a portion of an optical fiber in order to create a cleaved end face on the optical fiber.
Figure 25:
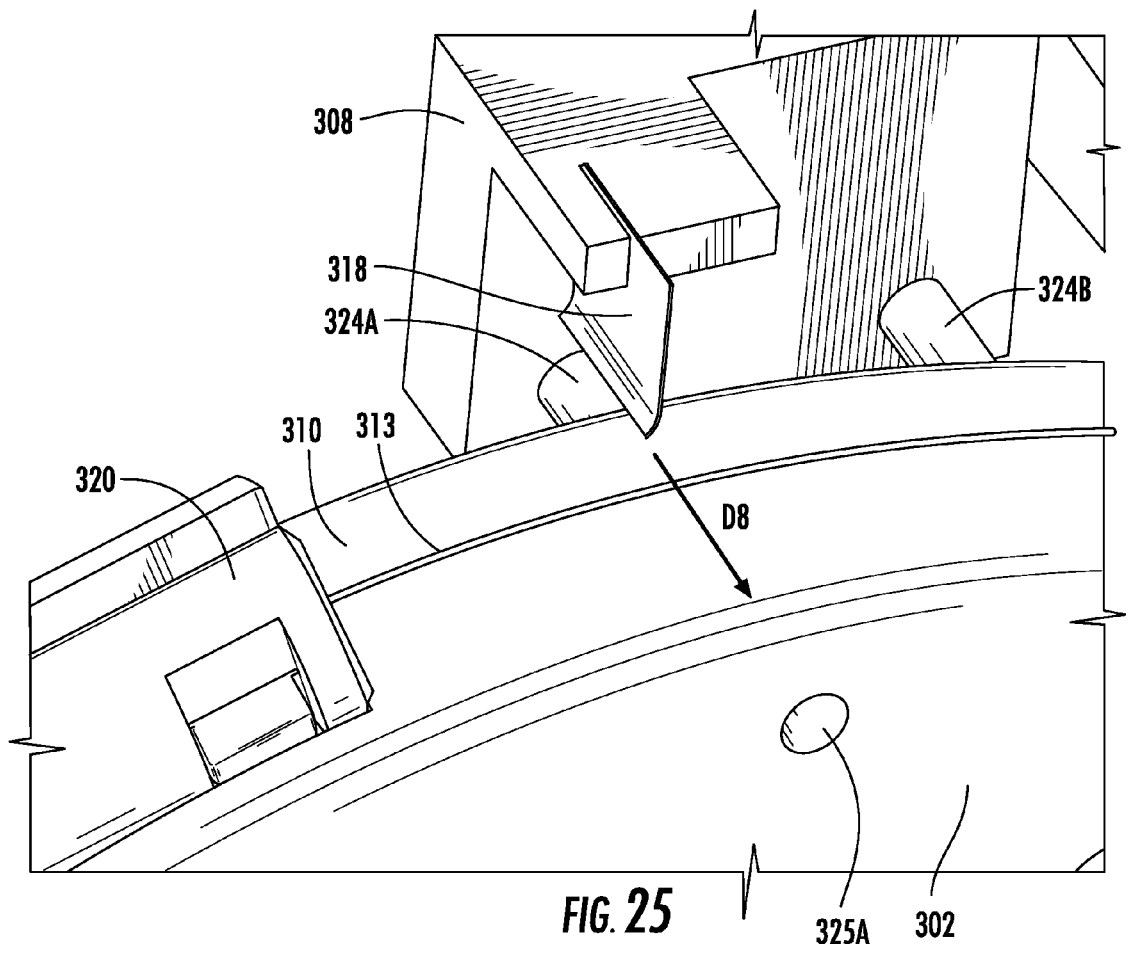
FIG. 25 is a close-up top view of a portion of the bladeless cleaver of FIGS. 22A-22D that illustrates the method of operation of the bladeless cleaver to create a flaw in a portion of an optical fiber in order to create a cleaved end face on the optical fiber.

With reference to FIGS. 23, 24, and 25, the method of operation of the bladeless cleaver 300 to create a flaw in a portion of an optical fiber in order to create a cleaved end face on the optical fiber may be as follows. FIG. 23 is a close-up top view of a portion of the bladeless cleaver 300 of FIGS. 22A-22D. The handle 304A is not shown in FIG. 23 for ease of viewing the cleaving process. Once the handle 304A is folded back by the technician, the technician may insert a fiber handler 320 into the slot 312 of the body 302 of the bladeless cleaver 300, as described above with respect to FIG. 22D. The fiber handler 320 is configured to receive an optical fiber 314. Any coating disposed on the outside of a portion 313 of the optical fiber 314 may be removed (stripped) prior to placing the optical fiber 314 into the fiber handler 320 by any conventional stripper (not shown). In one embodiment, the stripper may be incorporated into the bladeless cleaver 300.

When the technician inserts the fiber handler 320 into the slot 312, the portion 313 of the optical fiber 314 will be bent around the arcuate exterior surface 310 of the body 302, and the portion 313 of the optical fiber 314 will be positioned proximate the cleaver structure 308. The arcuate exterior surface 310 of the body 312 provides the radius $R_7$ for an optical fiber to follow for cleaving. The cleaver structure 308 includes the abrasive medium carrier 318 that includes an abrasive medium. In the embodiment of FIG. 24, the cleaver structure 308 also includes a clamp 322. The clamp 322 may be actuated to engage the portion 313 of the optical fiber 314 and provide a tension to the portion 313 of the optical fiber 314. The fiber handler 320 may be used to help guide or route the fiber 314 along the arcuate exterior surface 310 of the body 302 such that a bend is placed in the portion 313 of the optical fiber 314.

As seen in FIGS. 24 and 25, once the portion 313 of the optical fiber 314 is bent along the arcuate exterior surface 310 of the body 302 and is proximate the cleaver structure 308, the cleaver structure 308 may be actuated in the direction $D_8$ toward the body 302 of the bladeless cleaver 300 by the technician in order to place an abrasive medium disposed on the abrasive medium carrier 318 in contact with the portion 313 of the optical fiber 314 in order to introduce a flaw in the portion 313 of the optical fiber 314, which is necessary to cleave the optical fiber 314.

In other embodiments, the cleaver structure 308 may include an actuator for actuating the abrasive medium carrier 318 such that the abrasive medium disposed in the abrasive medium carrier 318 is placed into contact with the portion 313 of the optical fiber 314 bent around the arcuate exterior surface 310 to induce a flaw in the portion 313 of the optical fiber 314. The abrasive medium carrier 318 may be controlled in a swiping motion for example. In one embodiment, the actuator may be spring-actuated within the bladeless cleaver 300 in a manner similar to that illustrated in FIGS. 5 and 6. For example, as seen in FIGS. 24 and 25, the cleaver structure 308 may be attached to the body 302 by two shafts 324A and 324B disposed in the cleaver structure 308 to space apart the cleaver structure 308 from the body 302 when the cleaver structure 308 is attached to the body 302. The shafts 324A and 324B are disposed through openings 325A and 325B in the body 302. Springs (not shown) are disposed inside the shafts 324A and 324B. In this manner, the cleaver structure 308 is spring-actuated with the body 302. In FIG. 25, the cleaver structure 308 is shown in the open position.

Figure 26A:
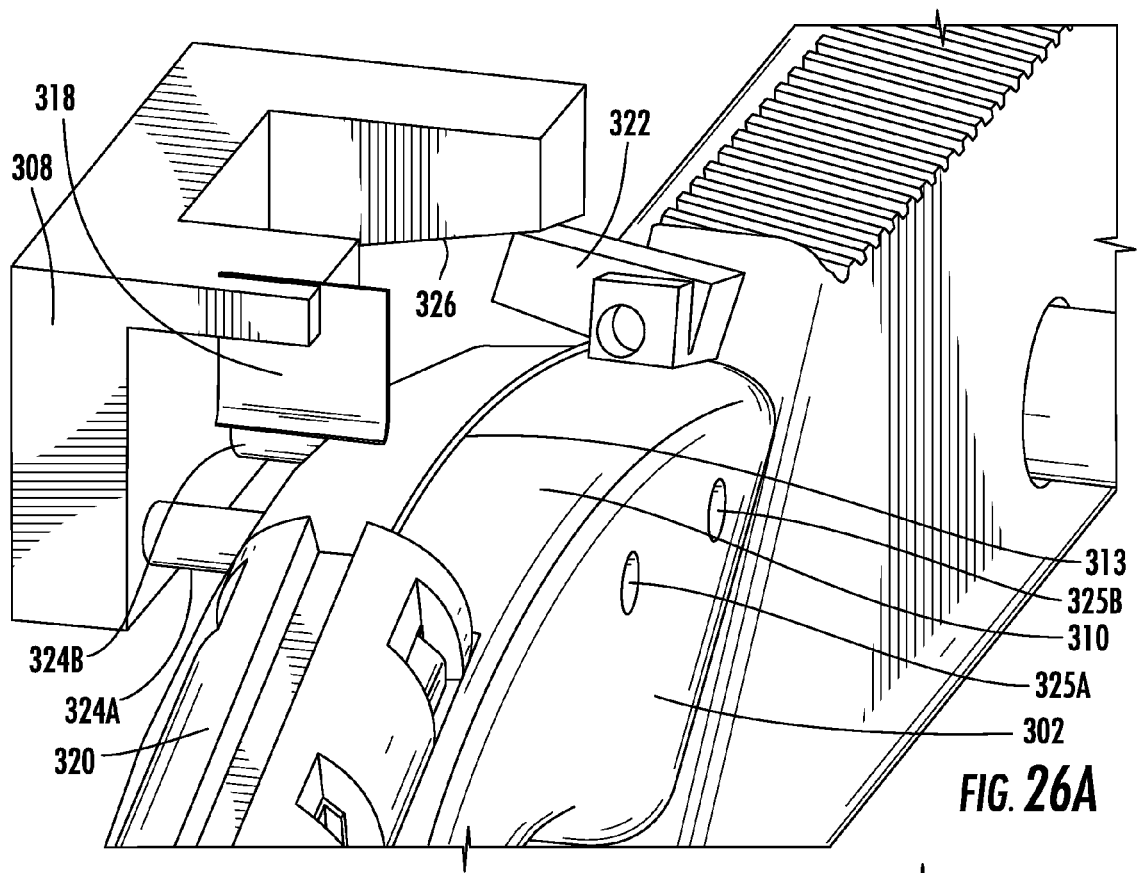
FIG. 26A is a top view of an exemplary bladeless cleaver that illustrates both a cleaver structure and a clamp of the exemplary bladeless cleaver in an open position prior to the start of a cleaving process.

FIG. 26A is a top view of the bladeless cleaver 300 that shows both the cleaver structure 308 and the clamp 322 in an open position prior to the cleaving process beginning. When the cleaver structure 308 and the clamp 322 are in an open position, the technician may strip the portion 313 of the optical fiber 314 and feed the portion 313 (with exposed glass) along the arcuate exterior surface 310 of the body 302 to place the portion 313 (with exposed glass) of the optical fiber 314 proximate the cleaver structure 308. The clamp 322 may be actuated to engage the portion 313 of the optical fiber 314 and provide a tension to the portion 313 of the optical fiber 314. The fiber handler 320 may be used to help guide or route the optical fiber 314 along the arcuate exterior surface 310 of the body 302 such that a bend is placed in the portion 313 of the optical fiber 314. In one embodiment, the cleaver structure 308 has an angled surface 326, which may act to press down on the portion 313 of the optical fiber 314 as the cleaver structure 308 is moved toward the portion 313 of the optical fiber 314 when the technician actuates the cleaver structure 308. In one embodiment, the clamp 322 may be actuated separately from the cleaver structure 308. In another embodiment, the clamp 322 is cooperatively connected to the cleaver structure 308 such that the actuation of the cleaver structure 308 also actuates the clamp 322 and closes the clamp 322. In either embodiment, when the clamp 322 is actuated, the clamp 322 engages the portion 213 of the optical fiber 214 and provides a tension to the portion 213 of the optical fiber 214.

Figure 26B:
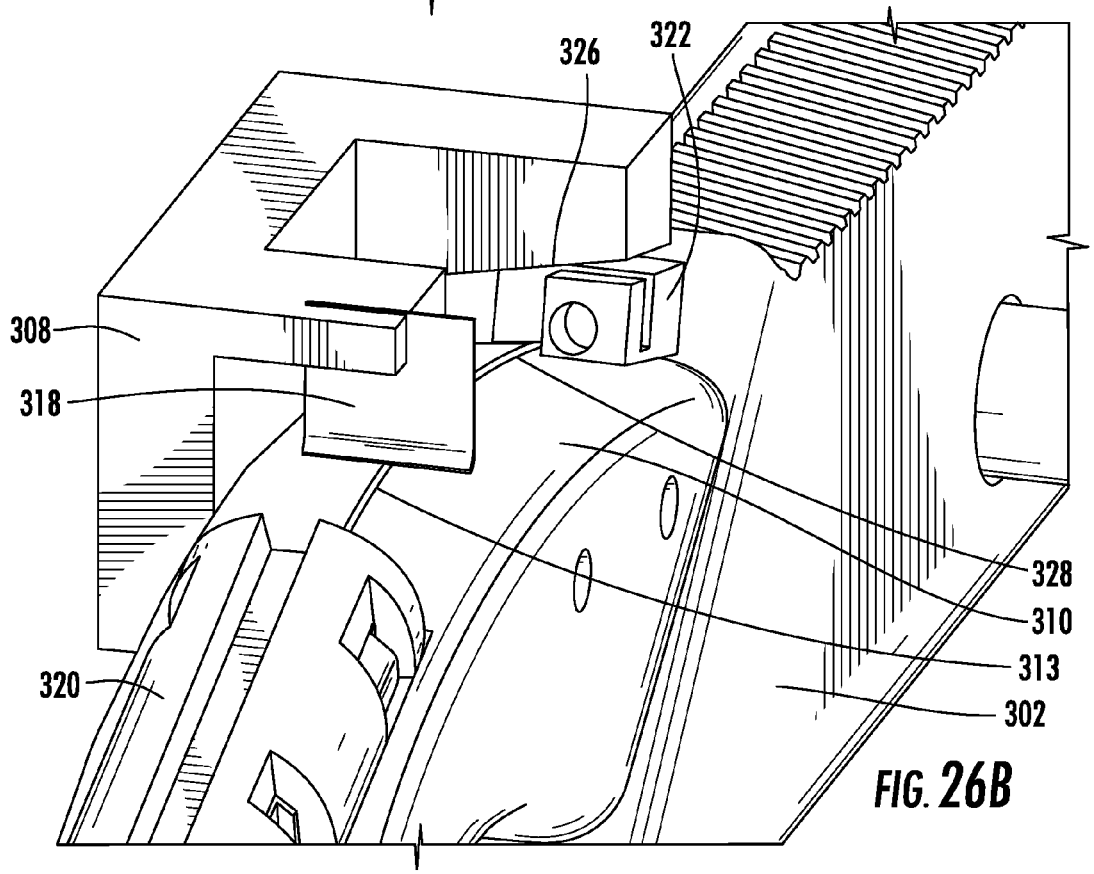
FIG. 26B is a top view of an exemplary bladeless cleaver that illustrates both a cleaver structure and a clamp of the exemplary bladeless cleaver in a closed position after a technician has initiated the cleaving process.

FIG. 26B is a top view of the bladeless cleaver 300 that shows both the cleaver structure 308 and the clamp 322 in a closed position after the technician has actuated the cleaver structure 308 and the clamp 322. The clamp 322 holds the portion 313 of the optical fiber 314 in place. The abrasive medium on the abrasive medium carrier 318 has scored the portion 313 of the optical fiber 314 in order to create a flaw in the portion 313 of the optical fiber 314. Once the flaw is created, the tension and bend provided by the arcuate exterior surface 310, alone or in conjunction with the tension applied to the optical fiber 314 by the clamp 322, will propagate the cleave through the optical fiber 314 creating a usable end face.

When the cleave is made, the portion 313 of the optical fiber 314 to be used may be removed from the bladeless cleaver 300. A scrap portion 328 of the optical fiber 314 will remain held in place by the clamp 322. The scrap portion 328 may then be removed from the bladeless cleaver 300 by the technician opening the clamp 322 and the scrap portion 328 can be discarded. Alternatively, if the bladeless cleaver 300 is designed as a single use cleaver or a disposable cleaver whose recommended number of uses has been reached, the entire bladeless cleaver 300 with the retained scrap portion 328 may be thrown away. In one embodiment, where the abrasive medium carrier 318 is provided in the form of tear away sheets of film, the body 302 of the bladeless cleaver 300 may be used multiple times, with the sheets of film disposed on the abrasive medium carrier 318 being torn away after each use.

Figure 27:
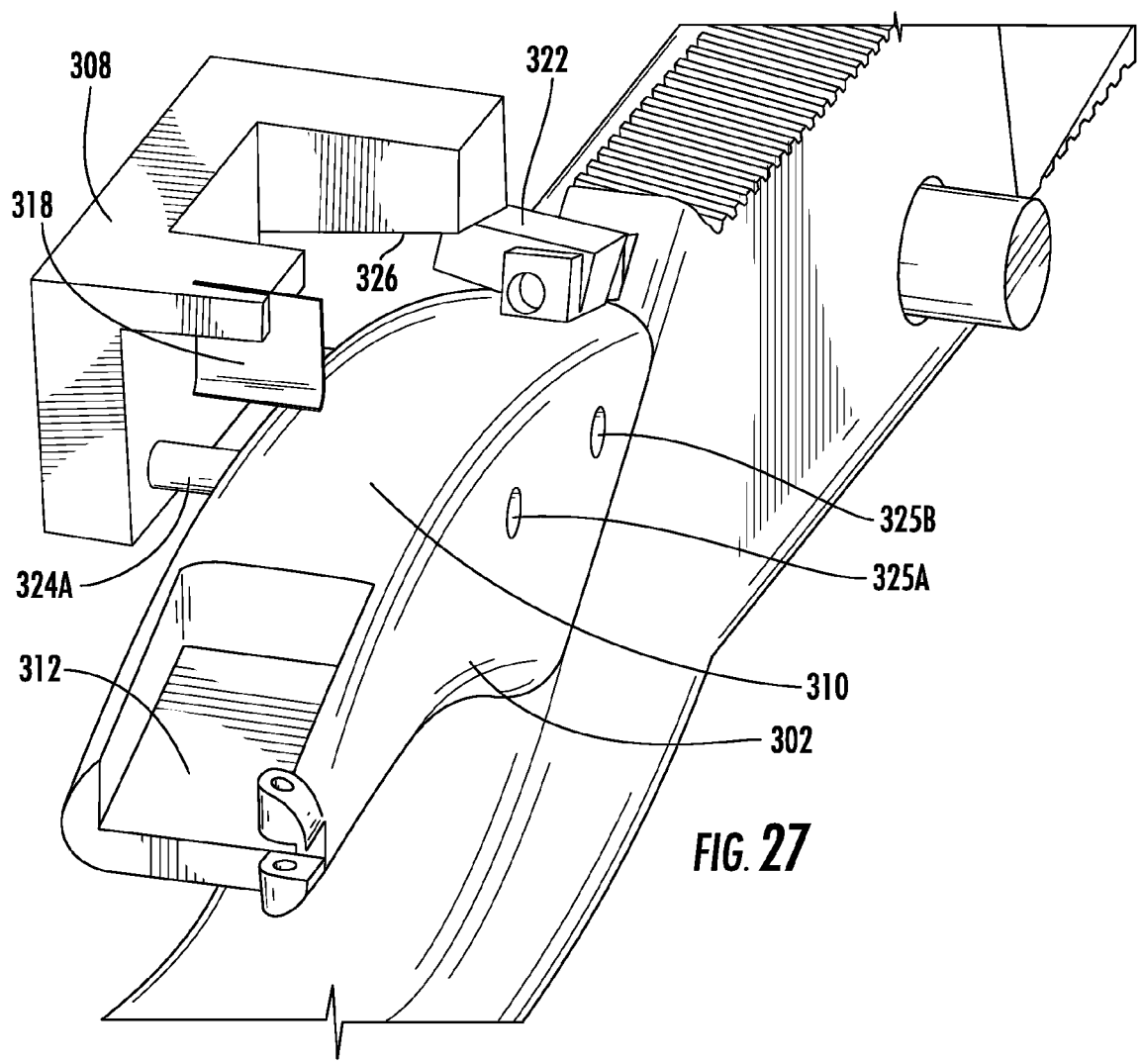
FIG. 27 is a top view of an exemplary bladeless cleaver that shows a close-up view of an arcuate exterior surface of the body of the exemplary bladeless cleaver and a the slot in which a fiber handler with an optical fiber may be inserted.

FIG. 27 is a top view of the bladeless cleaver 300 without the fiber handler 320 and the optical fiber 314. FIG. 27 shows a close-up view of the arcuate exterior surface 310 of the body 302 of the bladeless cleaver 300. FIG. 27 also shows the slot 312 in which the fiber handler 320 is inserted. In one embodiment, the slot 312 is in the form of a pocket configured to correspond to the shape of the fiber handler 320.

The abrasive medium disposed on abrasive medium carrier 318 of the bladeless cleaver 300 may take any number of forms, similar to the abrasive medium 20 disclosed above with respect to FIG. 1. For example, the abrasive medium may be material provided in grit form on the abrasive medium carrier 318. The abrasive medium may be provided by any type of material or combination or compound of elements or materials. Non-limiting examples of the abrasive medium include, but are not limited to, diamond, silicon carbide, aluminum oxide, silicon dioxide, cerium oxide, and ferrous oxide. The size of the abrasive medium may be any size. As an example only, the size of the abrasive medium may be between five (5) and twenty (20) micrometers (μm) as a non-limiting example. For example, the abrasive medium may be fifteen (15) μm diamond, or eight (8) μm carbide, as non-limiting examples. The abrasive medium may be disposed or deposited on the entire surface area of the film or only a portion of the surface area of the film. For example, the abrasive medium may be disposed on an edge of the film.

In addition, the abrasive medium carrier 318 of the bladeless cleaver 300 may be rigid or flexible. Providing a flexible abrasive medium carrier 318 allows a precise portion of the abrasive medium disposed or deposited thereon to be placed into contact with the portion 313 of the optical fiber 314 to induce the flaw. Providing a flexible abrasive medium carrier 318 may also allow the deploying of the abrasive medium in cleavers and other packagings that may not be possible or convenient if a conventional blade cleaver were employed. The abrasive medium carrier 318 does not include a conventional sharp blade that can easily be placed into precise contact with an optical fiber.

In the embodiments where the abrasive medium carrier 318 comprises sheets of film, the attachment of the film may be of low tolerance. In addition, the film comprising the abrasive medium may be configured such that the film has a slight bow to it, which will translate into a downward force against the portion 313 (with exposed glass) of the optical fiber 314 during cleaving. The amount of the bow in one embodiment is enough to ensure that the film having the abrasive medium is in contact with the portion 313 (with exposed glass) of the optical fiber 314 during as much of the swiping motion of the abrasive medium carrier 318 as possible. In this manner, the flexible film will allow the abrasive medium to remain in contact with the portion 313 (with exposed glass) of the optical fiber 314 without having to maintain high tolerances for the location of the film.

Other non-limiting examples of carriers for the abrasive medium carrier 318 include, but are not limited to, a wire, a string, a block, and a body. The abrasive medium carrier 318 may be of any size and made from any type of material desired, including but not limited to a polymer, plastic, and metal, as non-limiting examples. The quality and nature of the abrasive medium carrier 318 and the abrasive medium disposed thereon determine the life or number of uses to cleave the optical fiber.

The bladeless cleavers described herein may be designed as a single (or low use) cleaver to be used in a cost effective way. The bladeless cleavers disclosed herein may be capable of making at least one cleave, but may have a limited service life. In the case of limited use, the cleaver structure or the abrasive medium carrier could either exhaust at a defined number of uses or a number of replacements would be included in the toolkit, consumables kit, or other packaging (with the ability to be ordered separately). The bladeless cleavers described herein may be shipped as a consumable kit, or other packaging, with the other parts (such as connectors) used by a technician to establish an optical connection in the field. In this manner, cleaver maintenance may be eliminated as the cleaver will simply be disposed of after its life is used up. In addition, because of the use of a flexible abrasive medium carrier, the components of the cleaver may have simpler designs with low precision molded components in some embodiments. This low precision should allow for the components to be manufactured inexpensively and any necessary assembly will not require critical alignment. In one embodiment, the body of the bladeless cleaver may be an inexpensive plastic component. In other embodiments, the body of the bladeless cleaver may be non-disposable (such as a tool) and the carrier structure and/or the abrasive medium carrier may be disposable.

In the embodiments where a bladeless cleaver as described herein is incorporated into a tool, toolkit, a consumables kit, or other apparatus or packaging that is used by a technician to establish an optical connection in the field, the assortment of necessary prep tools is reduced since some of the necessary tools are combined. This is particularly beneficial where both copper wiring and optical fiber are being installed. For example, a copper "can" tool could house a bladeless cleaver of the type described herein. In addition, the process of scrap disposition is made easier and more efficient by combining the cleaving step with any one of, or a combination of, the tools and consumables kits or other packaging having a receptacle for trash. By adding a disposable bladeless cleaver to a hand tool or consumables kit or other packaging that includes hand tools (both tools directly related to fiber optic cable preparation, such as a fiber optic buffer and coating stripper, or a ring tool, and standard hand tools, such as screwdrivers, hammers, box knives, copper "can" tools, electrical tape dispensers, tape measures, and the like), the cleaving of an optical fiber in the field is made easier, quicker, and more efficient in some embodiments. The bladeless cleavers disclosed herein are low cost, which allows consumers a cost effective option for an entire toolkit, consumables kit, or other packaging. The toolkit, consumables kit, or other packaging becomes a viable option for more customers since the conventional blade cleaver, the most expensive item, has been replaced. A consumables kit is a good fit with the bladeless cleaver described herein since all the other necessary items for cleaving an optical fiber (cleaning solution and wipes, connectors, and cleaving mechanism) would then be inexpensive and compact. A toolkit, consumable kit, or other packaging that includes the disposable cleaver may be used with a non-disposable cleaver body in some embodiments. The abrasive medium could be in the form of single or limited use peel off tabs (similar to book page marking tabs), a indexing reel of abrasive media (similar to a commercially available fiber optic ferrule endface cleaning trade named "Cle-top"), or a wire/thin strip of abrasive media (similar to a violin bow).

The embodiments disclosed herein are not limited to any particular optical fiber, abrasive medium, carrier, angle of cleaving, stress, and fiber stripping, and method of applying the abrasive medium to the optical fiber. The cleaved optical fiber ends disclosed herein may be disposed or formed on individual fibers or arrays of fibers. A polishing process may be performed after the optical fiber is cleaved.

As used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Bend insensitive multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about one (1) μm (micron), said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about ten (10) meters, even more preferably less than about 5 meters, and in some embodiments less than one (1) meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least one (1) micron, wherein the width of said inner cladding is at least about 0.5 microns and the fiber further exhibits a one (1) turn, ten (10) millimeters (mm) diameter mandrel wrap attenuation increase of less than or equal to about 0.4 decibel (dB)/turn at 850 nanometers (nm), a numerical aperture of greater than 0.14, more preferably greater than 0.17, even more preferably greater than 0.18, and most preferably greater than 0.185, and an overfilled bandwidth greater than 1.5 GigaHertz (GHz)-kilometer (km) at 850 nm.

Fifty (50) micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a one (1) turn, ten (10) mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R, wherein 10≤R≤40 microns, more preferably 20≤R≤40 microns. In some embodiments, 22≤R≤34 microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a one (1) turn, ten (10) mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 28:
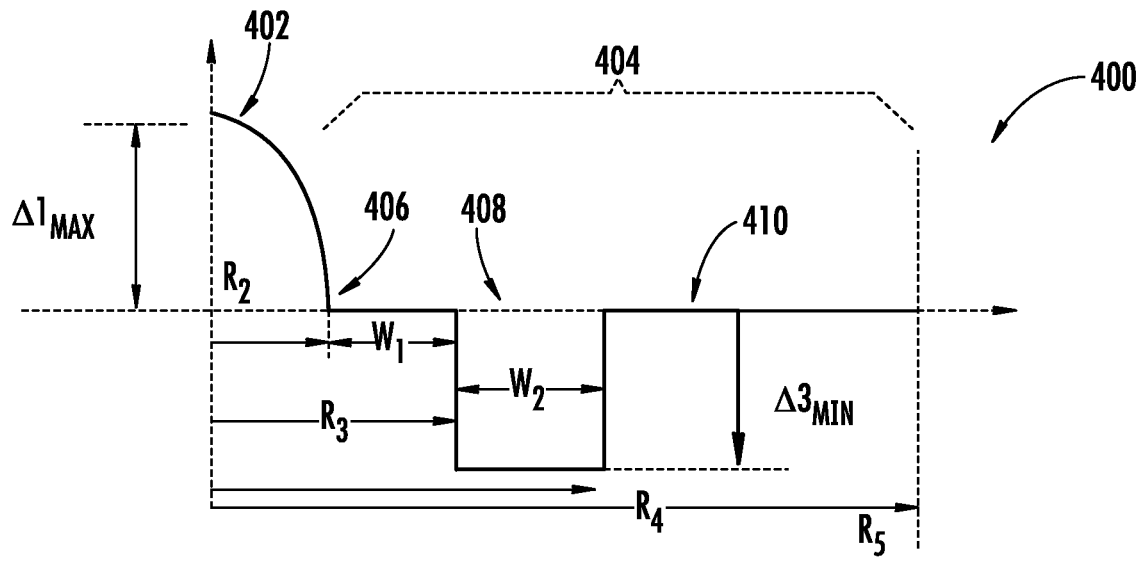
FIG. 28 shows a schematic representation (not to scale) of a refractive index profile of a cross-section of the glass portion of an exemplary embodiment of a multimode optical fiber disclosed herein wherein a depressed-index annular portion is offset from a core and is surrounded by an outer annular portion.
Figure 29:
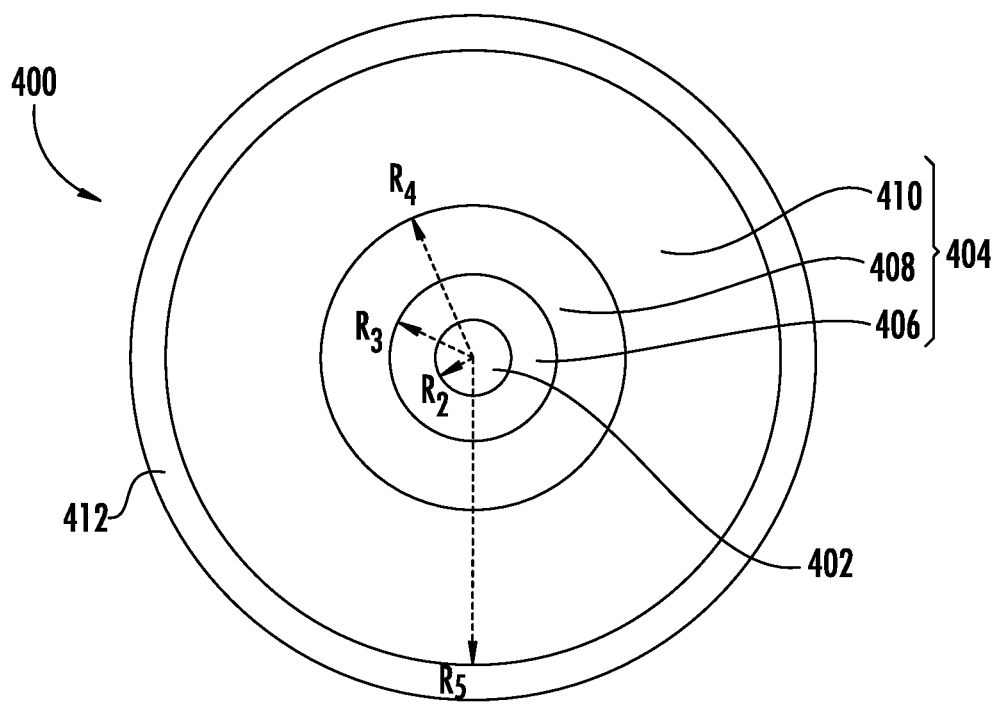
FIG. 29 is a schematic representation (not to scale) of a cross-sectional view of the multimode optical fiber of FIG. 28.

FIG. 28 shows a schematic representation of the refractive index profile of a cross-section of the glass portion of an embodiment of a multimode optical fiber 400 comprising a glass core 402 and a glass cladding 404, the cladding comprising an inner annular portion 406, a depressed-index annular portion 408, and an outer annular portion 410. FIG. 29 is a schematic representation (not to scale) of a cross-sectional view of the optical waveguide fiber of FIG. 28. The core 402 has outer radius $R_2$ and maximum refractive index delta Δ1MAX. The inner annular portion 406 has width $W_1$ and outer radius $R_3$. Depressed-index annular portion 408 has minimum refractive index delta percent Δ3MIN, width $W_2$ and outer radius $R_4$. The depressed-index annular portion 408 is shown offset, or spaced away, from the core 402 by the inner annular portion 406. The annular portion 408 surrounds and contacts the inner annular portion 406. The outer annular portion 410 surrounds and contacts the annular portion 406. The clad layer 404 is surrounded by at least one coating 412, which may in some embodiments comprise a low modulus primary coating and a high modulus secondary coating.

The inner annular portion 406 has a refractive index profile Δ2(r) with a maximum relative refractive index Δ2MAX, and a minimum relative refractive index Δ2MIN, where in some embodiments Δ2MAX=Δ2MIN. The depressed-index annular portion 408 has a refractive index profile Δ3(r) with a minimum relative refractive index Δ3MIN. The outer annular portion 410 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 406 has a substantially constant refractive index profile, as shown in FIG. 28 with a constant Δ2(r); in some of these embodiments, Δ2(r)=0%. In some embodiments, the outer annular portion 410 has a substantially constant refractive index profile, as shown in FIG. 28 with a constant Δ4(r); in some of these embodiments, Δ4(r)=0%. The core 402 has an entirely positive refractive index profile, where Δ1(r)>0%. R1 is defined as the radius at which the refractive index delta of the core first reaches value of 0.05%, going radially outwardly from the centerline. Preferably, the core 402 contains substantially no fluorine, and more preferably the core 402 contains no fluorine. In some embodiments, the inner annular portion 406 preferably has a relative refractive index profile Δ2(r) having a maximum absolute magnitude less than 0.05%, and Δ2MAX<0.05% and Δ2MIN>−0.05%, and the depressed-index annular portion 408 begins where the relative refractive index of the cladding first reaches a value of less than −0.05%, going radially outwardly from the centerline. In some embodiments, the outer annular portion 410 has a relative refractive index profile Δ4(r) having a maximum absolute magnitude less than 0.05%, and Δ4MAX<0.05% and Δ4MIN>−0.05%, and the depressed-index annular portion 408 ends where the relative refractive index of the cladding first reaches a value of greater than −0.05%, going radially outwardly from the radius where Δ3MIN is found.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A bladeless cleaver for cleaving an optical fiber, comprising:
   a body having an arcuate exterior surface; and
   a cleaver structure attached to the body and comprising an abrasive medium carrier and an abrasive medium attached to the abrasive medium carrier,
   wherein the abrasive medium does not include a sharp edge,
   wherein a space is provided between the arcuate exterior surface of the body and the cleaver structure and receives a portion of the optical fiber such that the portion of the optical fiber is positioned along a majority of the arcuate exterior surface of the body, and
   wherein the abrasive medium carrier is configured to move and reciprocate in a transverse direction substantially perpendicular to a lateral edge of the arcuate exterior surface of the body and thereby place the abrasive medium in contact with the portion of the optical fiber received in the space between the arcuate exterior surface and cleaver structure to create a flaw in the portion of the optical fiber.

2. The bladeless cleaver of claim 1, wherein the abrasive medium is disposed on the abrasive medium carrier in sizes between 5 micrometers (μm) and 50 micrometers (μm).

3. The bladeless cleaver of claim 1, wherein the abrasive medium carrier is comprised from the group consisting of a film, an index reel, a wire, a string, a block, and a body.

4. The bladeless cleaver of claim 1, wherein the cleaver structure comprises an actuator configured to actuate with respect to the body to place the abrasive medium in contact with the portion of the optical fiber.

5. The bladeless cleaver of claim 4, wherein the actuator is spring-loaded.

6. The bladeless cleaver of claim 1, wherein the cleaver structure is integrated into the body.

7. The bladeless cleaver of claim 1, wherein the abrasive medium carrier comprises a pull tab of flexible films.

8. The bladeless cleaver of claim 1, wherein the arcuate exterior surface has a radius between three (3) and four (4) inches.

9. A bladeless cleaver for cleaving an optical fiber, comprising:
   a body having an arcuate exterior surface, wherein the exterior surface has a width and a length; and
   a cleaver structure attached to the body and comprising an abrasive medium carrier and an abrasive medium attached to the abrasive medium carrier,
   wherein the abrasive medium does not include a sharp edge,
   wherein a space is provided between the arcuate exterior surface of the body and the cleaver structure and receives a portion of the optical fiber such that the portion of the optical fiber is positioned along a majority of the arcuate exterior surface of the body, and
   wherein the abrasive medium carrier is configured to move and reciprocate in a direction across the width of the arcuate exterior surface of the body and thereby place the abrasive medium in contact with the portion of the optical fiber received in the space between the arcuate exterior surface and cleaver structure to create a flaw in the portion of the optical fiber.

\* \* \* \* \*